US008660090B2

(12) United States Patent
Kojima

(10) Patent No.: US 8,660,090 B2
(45) Date of Patent: Feb. 25, 2014

(54) COMMUNICATION CONTROL APPARATUS, IDENTIFIER ALLOCATION METHOD FOR THE COMMUNICATION CONTROL APPARATUS, AND MOBILE COMMUNICATION SYSTEM

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 177 days.

(21) Appl. No.: 13/211,803

(22) Filed: Aug. 17, 2011

(65) Prior Publication Data

US 2011/0299499 A1    Dec. 8, 2011

Related U.S. Application Data

(63) Continuation of application No. PCT/JP2009/053750, filed on Feb. 27, 2009.

(51) Int. Cl.
*H04W 4/00* (2009.01)
(52) U.S. Cl.
USPC ..... 370/331; 370/338; 370/395.3; 455/432.1; 455/435.1; 455/441; 455/443; 455/456.2
(58) Field of Classification Search
USPC ......... 370/331, 338, 395.3; 455/432.1, 435.1, 455/436–443, 456.2
See application file for complete search history.

(56) References Cited

U.S. PATENT DOCUMENTS

| | | | |
|---|---|---|---|
| 5,634,197 A | 5/1997 | Paavonen | |
| 6,292,667 B1 | 9/2001 | Wallentin et al. | |
| 7,088,694 B1 * | 8/2006 | Rune | 370/331 |
| 2006/0063543 A1 | 3/2006 | Matoba et al. | |
| 2006/0291416 A1 * | 12/2006 | Rexhepi et al. | 370/331 |
| 2007/0047493 A1 * | 3/2007 | Park et al. | 370/331 |
| 2009/0303914 A1 | 12/2009 | Gonsa et al. | |
| 2010/0056177 A1 | 3/2010 | Kojima | |
| 2010/0093355 A1 * | 4/2010 | Voyer et al. | 455/436 |
| 2010/0135250 A1 | 6/2010 | Ishii et al. | |

FOREIGN PATENT DOCUMENTS

| | | |
|---|---|---|
| EP | 1 850 610 | 10/2007 |
| JP | 8-502639 | 3/1996 |
| JP | 2003-509922 | 3/2003 |
| JP | 2003-101506 | 4/2003 |

(Continued)

OTHER PUBLICATIONS

Office Action issued for corresponding Japanese Patent Application No. 2011-501431, dated Oct. 16, 2012, with partial English translation.

(Continued)

*Primary Examiner* — Alvin Zhu
(74) *Attorney, Agent, or Firm* — Myers Wolin, LLC

(57) ABSTRACT

A first base station forms a cell group including a first cell and a second cell partly overlapping with the first cell. A second base station forms a cell group including a third cell and a fourth cell partly overlapping with the third cell. An allocator of a communication control apparatus specifies an identifier for wireless communication that differs from any of wireless communication identifiers already allocated to mobile devices existing within either the first or second cell forming the cell group, and allocates the specified wireless communication identifier to a mobile device existing in the cell group constituted by the first and second cells. A transmitter transmits the identifier allocated by the allocator to the mobile device via the first base station.

7 Claims, 21 Drawing Sheets

(56) References Cited

FOREIGN PATENT DOCUMENTS

| | | |
|---|---|---|
| JP | 2006-094005 | 4/2006 |
| JP | 2010-062770 | 3/2010 |
| JP | 2010-511334 | 4/2010 |
| WO | 95/05721 | 2/1995 |
| WO | 99/57935 | 11/1999 |
| WO | 2006/088082 | 8/2006 |
| WO | 2008/136531 | 11/2008 |

OTHER PUBLICATIONS

International Search Report issued for corresponding International Patent Application No. PCT/JP2009/053750, mailed Mar. 31, 2009.

* cited by examiner

FIG. 9

21a IDENTIFIER MANAGEMENT TABLE

| Identifier type | Used value | Mobile device MAC address | Connected base stations |
|---|---|---|---|
| SID | 2 | ... | RF1=Base station 3, RF2=Base station 5 |
| ... | ... | ... | ... |
| CID | ... | ... | ... |
| ... | ... | ... | ... |
| SLPID | ... | ... | ... |
| ... | ... | ... | ... |
| PSCID | ... | ... | ... |

24a GROUP MANAGEMENT TABLE

| Base station | Group | Communication control apparatus |
|---|---|---|
| Base station 1 | Group G1 | Communication control apparatus 1 |
| Base station 2 | Group G1 | Communication control apparatus 1 |
| Base station 3 | Group G1 | Communication control apparatus 1 |
| Base station 4 | Group G2 | Communication control apparatus 2 |
| Base station 5 | Group G2 | Communication control apparatus 2 |
| Base station 6 | Group G2 | Communication control apparatus 2 |

FIG. 10

44a GROUP CLASS MANAGEMENT TABLE

| Identifier type | Group class |
|---|---|
| SID | Group class C2 |
| CID | Group class C1 |
| SLPID | Group class C1 |
| PSCID | Group class C1 |

| Base station | Group class C1 | Group class C2 | Class C1 communication control apparatus | Class C2 communication control apparatus |
|---|---|---|---|---|
| Base station 1 | Group G11 | Group G21 | Communication control apparatus 1 | Communication control apparatus 1 |
| Base station 2 | Group G11 | Group G21 | Communication control apparatus 1 | Communication control apparatus 1 |
| Base station 3 | Group G11 | Group G21 | Communication control apparatus 1 | Communication control apparatus 1 |
| Base station 4 | Group G12 | Group G21 | Communication control apparatus 2 | Communication control apparatus 1 |
| Base station 5 | Group G12 | Group G21 | Communication control apparatus 2 | Communication control apparatus 1 |
| Base station 6 | Group G12 | Group G21 | Communication control apparatus 2 | Communication control apparatus 1 |

44b GROUP MANAGEMENT TABLE

COMMUNICATION CONTROL APPARATUS, IDENTIFIER ALLOCATION METHOD FOR THE COMMUNICATION CONTROL APPARATUS, AND MOBILE COMMUNICATION SYSTEM

This application is a continuing application, filed under 35 U.S.C. §111(a), of International Application PCT/JP2009/053750, filed on Feb. 27, 2009, now pending, the contents of which are herein wholly incorporated by reference.

FIELD

The embodiments discussed herein are related to a communication control apparatus for controlling base stations, an identifier allocation method for the communication control apparatus, and a mobile communication system.

BACKGROUND

In recent years, standardization has been advanced at the IEEE (Institute of Electrical and Electronics Engineers) with respect to a wireless communication technology called WiMAX (Worldwide Interoperability for Microwave Access). WiMAX defines, as its standards, IEEE 802.16d intended for fixed subscriber stations and IEEE 802.16e intended for mobile subscriber stations. Also, the next generation of the IEEE 802.16e standard is currently in the process of standardization.

The next generation of the IEEE 802.16e standard is defined as specifications that support, as requirements, multicarrier applications using a plurality of frequency bands to provide wireless communication services. In multicarrier applications, the multiple frequency bands used are sometimes discontinuous in terms of frequency. Where a wireless communication system is operated using discontinuous frequency bands, a plurality of cells with different cell radii are often formed because the cell radius is dependent on the frequency band used. The cell denotes the range within which the radio waves from a base station reach.

FIG. 21 exemplifies the formation of cells. As illustrated in FIG. 21, a base station 101 radiates radio waves of a frequency band Fa over an area of a cell Fa1. A base station 102 radiates radio waves of the frequency band Fa over an area of a cell Fa2, and also radiates radio waves of a frequency band Fb over an area of a cell Fb1. A base station 103 radiates radio waves of the frequency band Fa over an area of a cell Fa3. The frequency bands Fa and Fb bear a frequency relationship of Fa>Fb.

The lower the radio frequency, the more the radio waves diffract, exhibiting higher NLOS (Non Line of Sight) transmission characteristics. Accordingly, compared with a cell of higher frequency, a cell of lower frequency can be increased in cell radius. In the example illustrated in FIG. 21, therefore, the cell Fb1 of the frequency band Fb lower than the frequency band Fa has a greater cell radius than the cells Fa1 to Fa3. Also, in the example of FIG. 21, since the cell Fb1 of the base station 102 covers the areas of the base stations 101 and 103, neither of the base stations 101 and 103 forms a cell of the frequency band Fb.

In FIG. 21, the lines extending from the respective base stations 101 to 103 and each having a trifurcated end symbolize the antennas of the base stations 101 to 103, respectively, and indicate that the cells Fa1 to Fa3 and Fb1 are formed around the base stations 101 to 103 with the base stations as their center. Also, although in FIG. 21 the cells Fa1 to Fa3 and the cell Fb1 are illustrated in the upper and lower parts, respectively, in order to indicate the difference between the frequency bands, the cells Fa1 to Fa3 are in fact accommodated in the cell Fb1.

FIG. 21 also illustrates a mobile device 111 for communicating wirelessly with the base stations 101 to 103. The mobile device 111 has two wireless units (in FIG. 21, indicated at RF1 and RF2) for communicating wirelessly in the respective frequency bands Fa and Fb. The wireless unit RF1 communicates wirelessly in the frequency band Fa, and the wireless unit RF2 communicates wirelessly in the frequency band Fb.

The lines extending from the wireless units RF1 and RF2 of the mobile device 111 indicate that the wireless units RF1 and RF2 are communicating wirelessly with the base stations 101 to 103 having the cells to which the respective lines are connected. Thus, the example of FIG. 21 indicates that when the mobile device 111 exists at a location A, the wireless unit RF1 communicates wirelessly with the base station 102 within the cell Fa2 of the frequency band Fa while the wireless unit RF2 communicates wirelessly with the base station 102 within the cell Fb1 of the frequency band Fb.

In the next generation of the IEEE 802.16e standard, a base station allocates, to mobile devices, respective identifiers for controlling the wireless communication. Such identifiers include an identifier uniquely allocated to each mobile device belonging to the base station (located within the coverage of the base station) and an identifier allocated so as to be unique within the mobile device. The former identifier, which is unique within the base station, is allocated so that a plurality of mobiles devices located within the coverage of the base station may have respective different identifiers. On the other hand, the latter identifier has only to be unique within the mobile device and may be identical with those allocated to other mobile devices located within the coverage of the same base station.

For example, when the mobile device 111 exists at the location A illustrated in FIG. 21, the wireless units RF1 and RF2 both belong to the base station 102. In this case, the base station 102 allocates the mobile device 111 an identifier that is unique within the base station 102, as well as an identifier that is unique within the mobile device 111.

Meanwhile, a wireless communication system has been disclosed which is configured to simultaneously provide communication services by using a plurality of discontinuous frequency bands (see International Publication Pamphlet No. WO2006/088082, for example). Also, there has been disclosed a wireless LAN system which has an increased number of channels and which can be used in both indoor and outdoor environments (see Japanese Laid-open Patent Publication No. 2003-101506, for example). Further, a communication system has been disclosed in which optimum parameter setting and multiuser scheduling are performed so as to follow a difference between the requested QoS and the variation characteristics of individual frequency bands (see Japanese Laid-open Patent Publication No. 2006-94005, for example).

If the target base station to which either of the wireless units of the mobile device is connected changes due to movement of the mobile device, however, the identifier unique within the base station occasionally needs to be reallocated even if the target base station to which the other wireless unit is connected remains unchanged, giving rise to the problem that the wireless communication is adversely affected.

Let it be assumed, for example, that in FIG. 21 the mobile device 111 exists at the location A and belongs to the base station 102 and that the base station 102 has allocated the mobile device 111 the identifier "1", for example, which is unique within the base station 102.

Suppose that the mobile device 111 moves from the location A to a location B. In this case, the wireless unit RF2 of the mobile device 111 remains connected to the same base station 102 (cell Fb1) but the wireless unit RF1 connects to the base station 103 (cell Fa3), with the result that the mobile device 111 is connected to the base stations 102 and 103. If the identifier "1" is not used in the base station 103, the mobile device 111 can be continuously allocated the same identifier "1".

On the other hand, if the identifier "1" is already used in the base station 103, the base stations 102 and 103 negotiate with each other so that a common identifier not used by either of the base stations may be reallocated to the mobile device 111. For example, if the identifier "2" is not used by either of the base stations 102 and 103, the mobile device 111 is reallocated the identifier "2".

Where the wireless units RF1 and RF2 have come to belong to the different base stations 102 and 103, a common identifier is allocated to the mobile device 111 in order to allow the base stations 102 and 103 to control the mobile device 111 so that a single common MAC (Medium Access Control) entity encompassing the multiple wireless units of the mobile device 111 may be regarded as a single mobile device. If, for example, the mobile device 111 has different identifiers allocated by the different base stations 102 and 103, then it can hardly be said that the mobile device 111 is controlled by the base stations 102 and 103 so that the MAC entities thereof may be regarded as a single mobile device.

However, when the reallocation of the identifier is necessitated by the movement of the mobile device 111, the identifier is changed even if the target base station to which the wireless unit RF2 is connected remains unchanged. Such change of the identifier causes, for example, interruption of packets transmitted over the communication connection via the base station 102 or requires an additional authentication process, exerting an adverse influence on the wireless communication of the wireless unit RF2.

SUMMARY

According to one aspect of the present invention, there is provided a communication control apparatus for controlling communication of a mobile communication system including a plurality of cells formed by a plurality of base stations. The communication control apparatus includes a communication interface; and a processor configured to specify an identifier for wireless communication that differs from any of wireless communication identifiers already allocated to mobile devices existing within any of cells in a cell group constituted by a first cell and one or more cells partly overlapping with the first cell, and to allocate the specified wireless communication identifier to a mobile device existing in the cell group; and to control the communication interface to transmit the identifier allocated by the allocator to the mobile device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an exemplary data structure of an identifier management table;

FIG. 10 illustrates an exemplary data structure of a group management table;

FIG. 16 illustrates an exemplary data structure of a group class management table;

FIG. 17 illustrates an exemplary data structure of a group management table;

DESCRIPTION OF EMBODIMENTS

Figure 1:
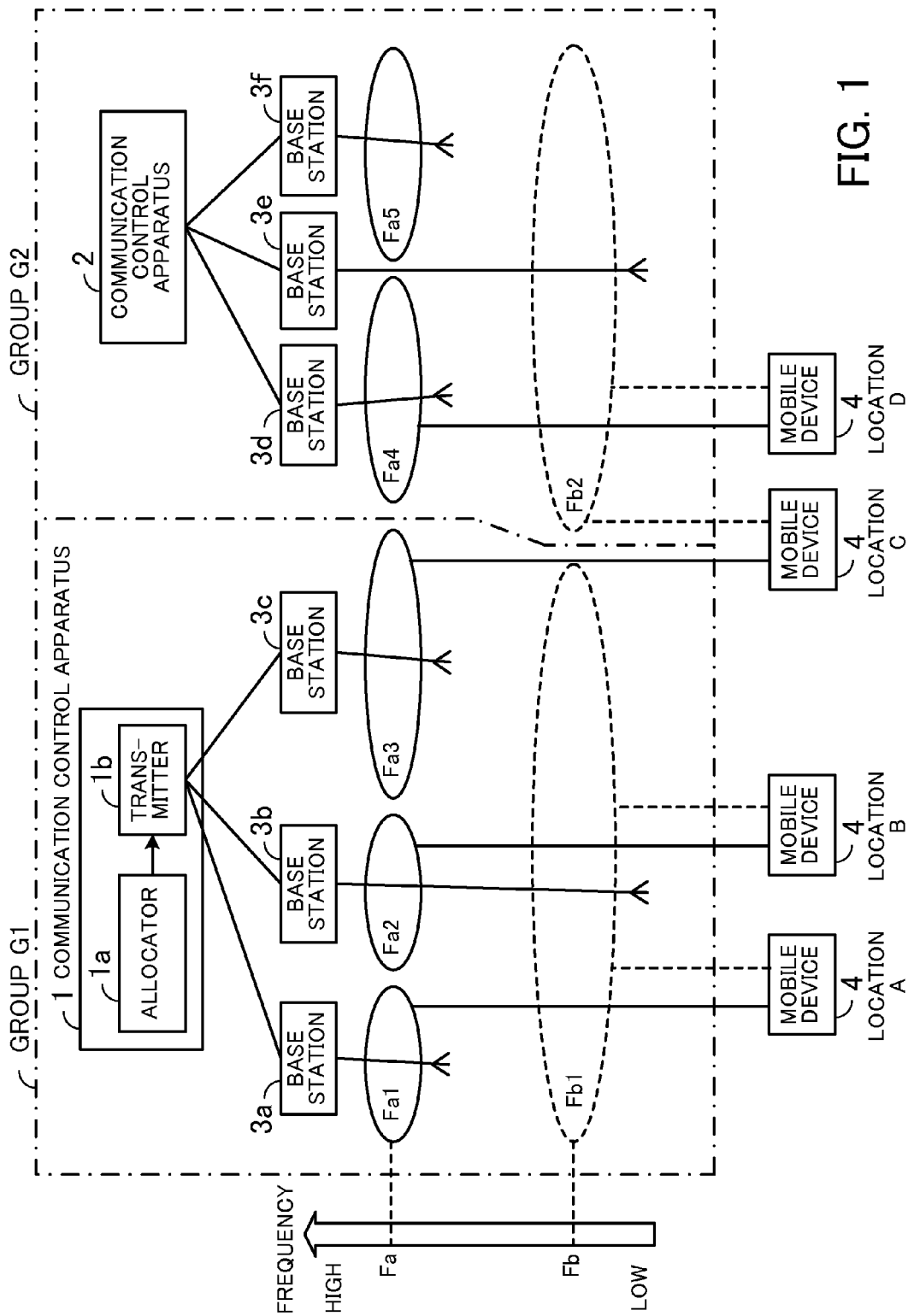
FIG. 1 illustrates communication control apparatuses.
Figure 21:
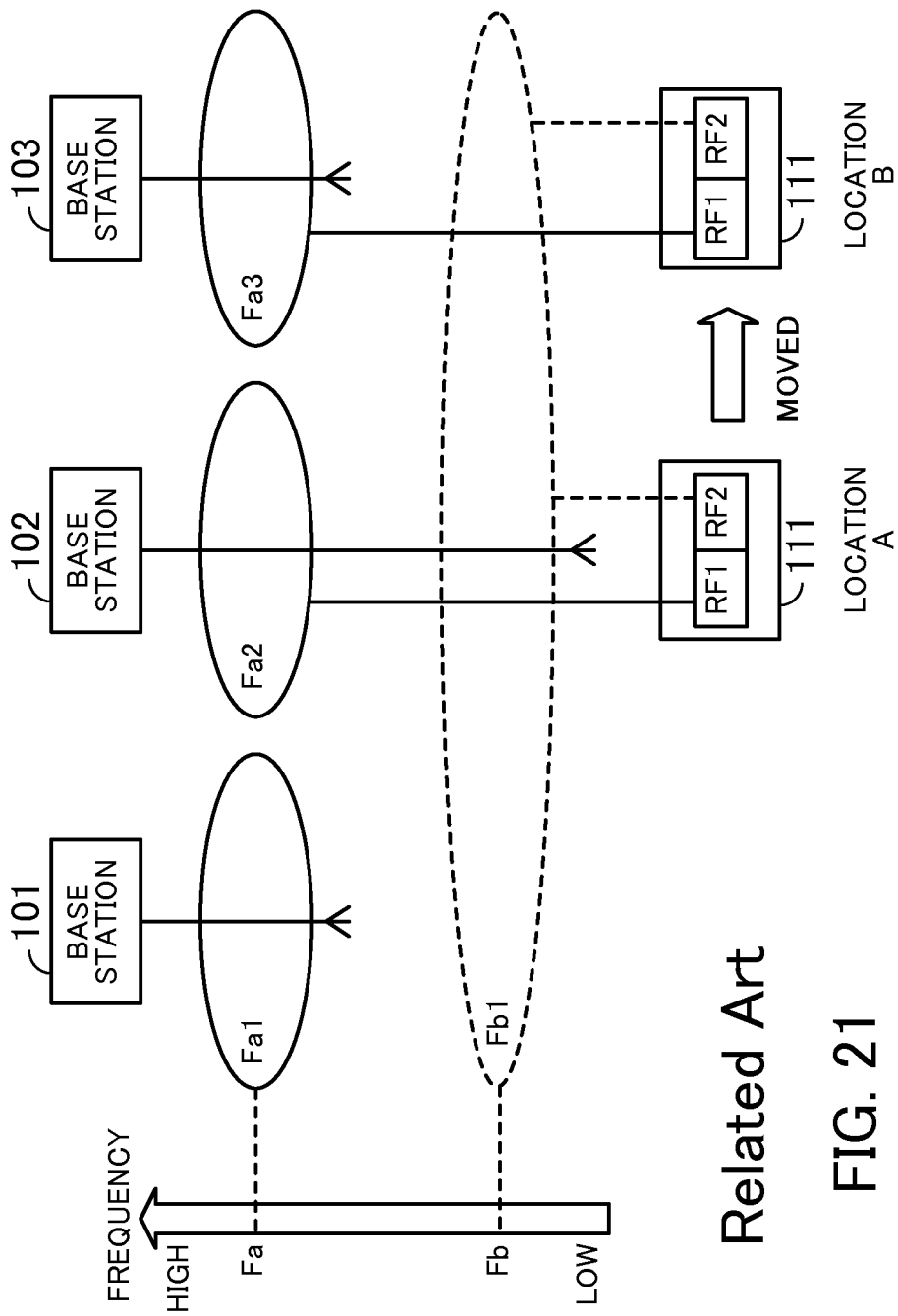
FIG. 21 exemplifies the formation of cells.

FIG. 1 illustrates communication control apparatuses. In FIG. 1, base stations 3a to 3f and a mobile device 4, which may exist at any of locations A to D, are also illustrated in addition to the communication control apparatuses 1 and 2. The base station 3a radiates radio waves of a frequency band Fa over an area of a cell Fa1. The base station 3b radiates radio waves of the frequency band Fa over an area of a cell Fa2, and also radiates radio waves of a frequency band Fb over an area of a cell Fb1. The base station 3c radiates radio waves of the frequency band Fa over an area of a cell Fa3. The base station 3d radiates radio waves of the frequency band Fa over an area of a cell Fa4, the base station 3e radiates radio waves of the frequency band Fb over an area of a cell Fb2, and the base station 3f radiates radio waves of the frequency band Fa over an area of a cell Fa5. The frequency bands Fa and Fb have a frequency relationship of Fa>Fb. The mobile device 4 has wireless units for communicating wirelessly in the multiple frequency bands Fa and Fb. What are represented by the lines extending from the base stations 3a to 3f and by the lines extending from the mobile device 4 are identical with those already explained above with reference to FIG. 21, and therefore, explanation of the lines is omitted.

The base stations 3a to 3f form cell groups each including a first cell and one or more cells partly overlapping with the first cell. In the example illustrated in FIG. 1, the base stations 3a to 3c form a cell group including the cell Fb1 and the cells Fa1 to Fa3 each partly overlapping with the cell Fb1. The base stations 3d to 3f form a cell group including the cell Fb2 and the cells Fa4 and Fa5 each partly overlapping with the cell Fb2.

The communication control apparatus 1 includes an allocator 1a and a transmitter 1b. Although not illustrated in FIG. 1, the communication control apparatus 2 also includes an allocator and a transmitter, like the communication control apparatus 1.

With respect to the mobile device 4 existing in any of the cells Fa1 to Fa3 and Fb1 constituting the cell group, the allocator 1a specifies an identifier for wireless communication that differs from any of the identifiers already allocated, and allocates the specified identifier to the mobile device 4 existing in the cell group constituted by the cells Fa1 to Fa3 and Fb1.

The transmitter 1b transmits the identifier allocated to the mobile device 4 by the allocator 1a, to the mobile device 4 via any of the base stations 3a to 3c.

Operation of the communication control apparatus 1 will be described below. Let it be assumed that the mobile device 4 enters the wireless communication network at the location A illustrated in FIG. 1, for example. The allocator 1a of the communication control apparatus 1 allocates the mobile device 4 a new identifier that differs from any of the identifiers already used in the cell group constituted by the cells Fa1 to Fa3 and Fb1. At the location A, the mobile device 4 is connected to the base stations 3a and 3b.

Let us suppose that the mobile device 4 moves from the location A to the location B. In this case, the target base station to which one of the wireless units of the mobile device 4 is connected changes from the base station 3a to the base station 3b, but since the identifier allocated to the mobile device 4 is unique within the cell group constituted by the cells Fa1 to Fa3 and Fb1, the allocator 1a need not reallocate the identifier.

Let it be assumed that the mobile device 4 further moves to the location C. In this case, the mobile device 4 is connected to the base stations 3c and 3d of the two different cell groups, one constituted by the cells Fa1 to Fa3 and Fb1 and the other by the cells Fa4, Fa5 and Fb2. The allocator 1a allocates the mobile device 4 a common identifier which is unused in the cell group constituted by the cells Fa1 to Fa3 and Fb1 as well as in the cell group constituted by the cells Fa4, Fa5 and Fb2 so that the identifier allocated to the mobile device 4 may differ from any of the identifiers used in the cell group of the cells Fa1 to Fa3 and Fb1 and the cell group of the cells Fa4, Fa5 and Fb2. For example, the allocator 1a communicates with the communication control apparatus 2 to allocate a common identifier which is unused in the cell group of the cells Fa1 to Fa3 and Fb1 as well as in the cell group of the cells Fa4, Fa5 and Fb2.

Further, suppose that the mobile device 4 moves to the location D. In this case, the mobile device 4, which exists in the cell group constituted by the cells Fa4, Fa5 and Fb2, is connected to the base stations 3d and 3e. At the location C, the identifier unused in the cell group of the cells Fa1 to Fa3 and Fb1 as well as in the cell group of the cells Fa4, Fa5 and Fb2 was allocated to the mobile device 4, and therefore, the mobile device 4 can continue the wireless communication by using the identifier.

In this manner, the communication control apparatus specifies an identifier for wireless communication that differs from any of the identifiers already allocated to the mobile devices existing in the cell group constituted by a first cell and one or more cells partly overlapping with the first cell, and allocates the specified identifier to a mobile device existing in the cell group. This eliminates the need to reallocate the identifier insofar as the mobile device exists within the cell group, whereby the number of times a unique identifier needs to be reallocated can be reduced.

A first embodiment will be now described in detail with reference to the drawings.

Figure 2:
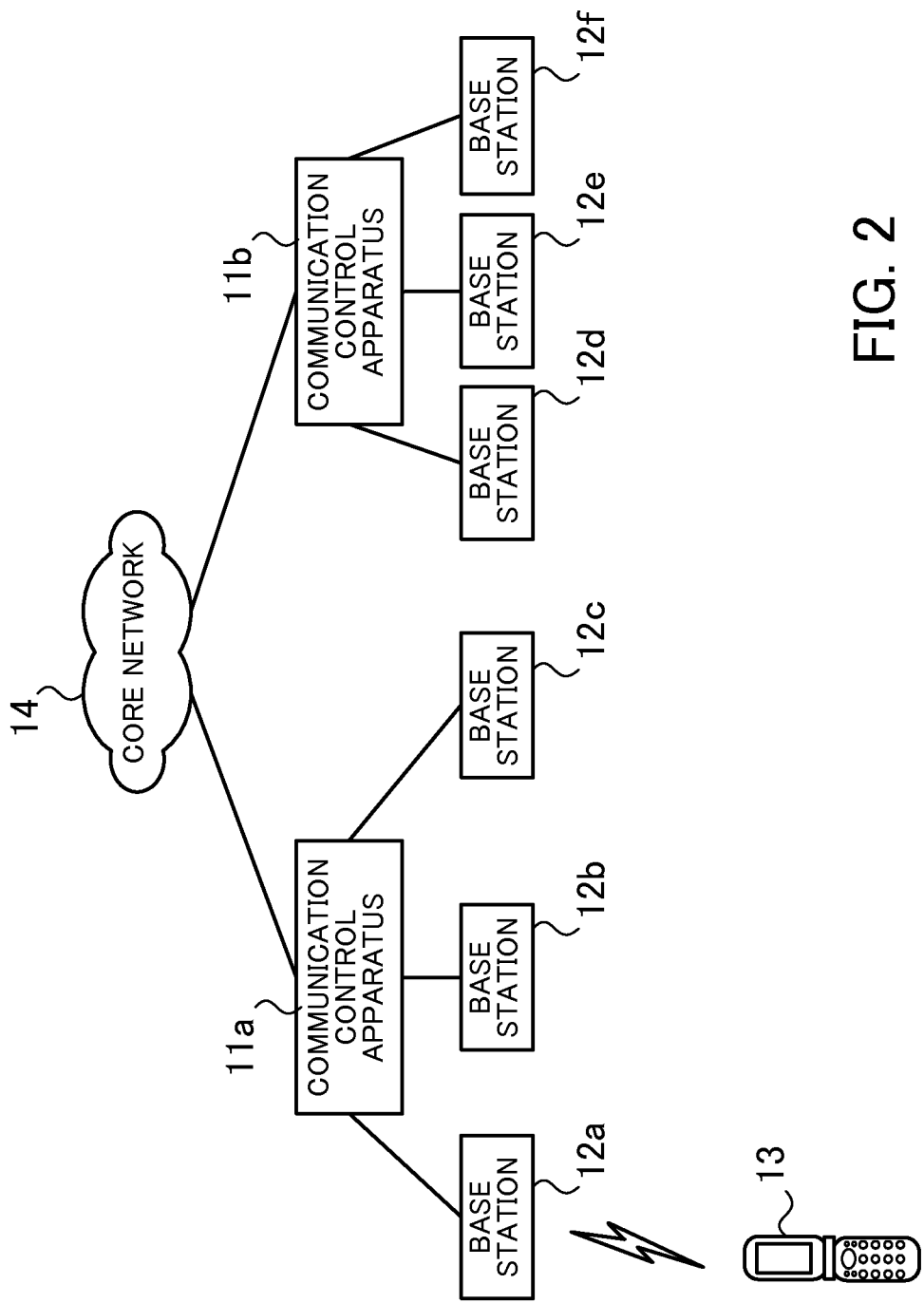
FIG. 2 illustrates an exemplary configuration of a wireless communication system according to a first embodiment.

FIG. 2 illustrates an exemplary configuration of a wireless communication system according to the first embodiment. As illustrated in FIG. 2, communication control apparatuses 11a and 11b are connected to a core network 14. Base stations 12a to 12c are connected to the communication control apparatus 11a, and base stations 12d to 12f are connected to the communication control apparatus 11b.

Each of the communication control apparatuses 11a and 11b is, for example, an ASN-GW (Access Service Network-Gateway). The communication control apparatuses 11a and 11b enable the base stations 12a to 12f and a mobile device 13 to exchange data with the core network 14, for example, and also take care of control of the base stations 12a to 12f and handover control.

The base stations 12a to 12f communicate wirelessly with the mobile device 13. The base stations 12a to 12f and the mobile device 13 illustrated in FIG. 2 communicate wirelessly with each other by using the WiMAX wireless technology, for example. The mobile device 13 is, for example, a mobile phone or an information terminal device. The mobile device 13 has wireless units capable of communicating wirelessly with the base stations 12a to 12f in respective different frequency bands.

The communication control apparatuses 11a and 11b allocate the mobile device 13 identifiers that allow the base stations 12a to 12f to control the mobile device 13. The identifiers include an identifier allocated uniquely within the respective coverage of the base stations 12a to 12f and an identifier allocated uniquely within the mobile device 13. The communication control apparatuses 11a and 11b manage the identifiers and allocate such unique identifiers to the mobile device 13.

Figure 3:
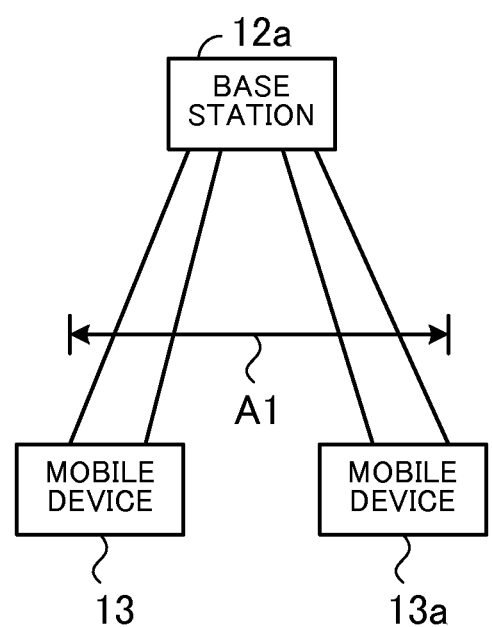
FIG. 3 is a diagram explaining an identifier allocated uniquely within a base station.

FIG. 3 is a diagram explaining the identifier allocated uniquely within the base station. Specifically, FIG. 3 illustrates the base station 12a and the mobile device 13, both illustrated in FIG. 2, and another mobile device 13a. The mobile devices 13 and 13a are assumed to belong to the base station 12a.

The mobile devices 13 and 13a are allocated control identifiers that are unique within the base station 12a, as indicated by an arrow A1. Specifically, the mobile devices 13 and 13a are allocated identifiers of respective different values by the communication control apparatus 11a.

The identifier allocated uniquely within the base station may be a Station Identifier (hereinafter SID), for example. The SID is included in various control messages exchanged between the base stations 12a to 12f and the mobile devices 13 and 13a.

The mobile devices 13 and 13a each have a MAC address, which is an identifier uniquely assigned thereto in advance at the time of manufacture, for example. Since the MAC address has a relatively long bit length, however, the overhead increases if the MAC address is included in each of the various control messages exchanged. Thus, the SID shorter in bit length than the MAC address is used in order to reduce the overhead.

In addition to the SID, the identifier allocated uniquely within the base station may be a Connection ID (hereinafter CID) for identifying a communication connection between the base station 12a and the mobile devices 13 and 13a, a flow ID, or a sleep ID (hereinafter SLPID) for controlling the status of the mobile devices 13 and 13d in sleep mode. Where a plurality of connections are established between the base station 12a and the mobile device 13, for example, the CID is allocated uniquely to the individual connections so that each connection can be distinguished from the others.

The communication control apparatuses 11a and 11b divide the base stations 12a through 12f into a group of the base stations 12a to 12c and a group of the base stations 12d to 12f, as described later, and allocate the mobile device 13 the aforementioned identifier which is unique within the respective groups. Since the communication control apparatuses 11a and 11b allocate the identifier so as to be unique within the respective groups, the identifier assumes a unique value within the base stations 12a to 12f of the respective groups.

Figure 4:
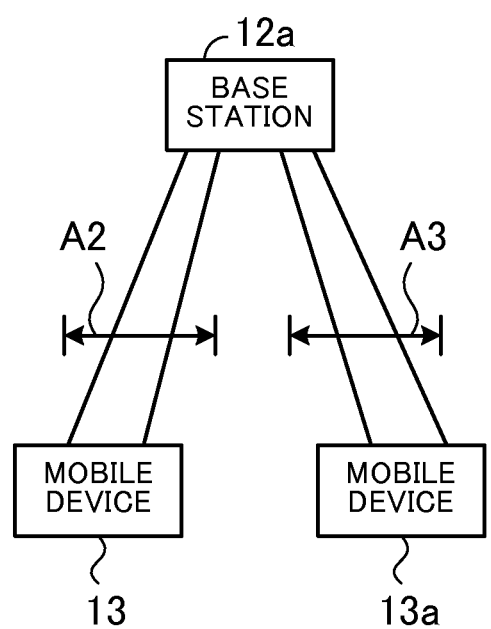
FIG. 4 is a diagram explaining an identifier allocated uniquely within a mobile device.

FIG. 4 is a diagram explaining the identifier allocated uniquely within the mobile device. Specifically, FIG. 4 illustrates the base station 12a and the mobile device 13, both appearing in FIG. 2, and the mobile device 13a. Let us suppose that the mobile devices 13 and 13a belong to the base station 12a.

The mobile devices 13 and 13a are allocated identifiers which are unique within the respective mobile devices 13 and 13a, as indicated by arrows A2 and A3. That is, the mobile devices 13 and 13a are allocated identifiers, of which the values are different from those used within the respective mobile devices 13 and 13a, by the communication control apparatus 11a.

The identifier allocated uniquely within the individual mobile devices 13 and 13a may be a Power_Saving_Class_ID (hereinafter PSCID), for example. The PSCID is an identifier identifying the parameter set defining Listening Windows (registered trademark) in sleep mode and Sleep Windows. Where a new parameter set is defined in either of the mobile devices 13 and 13a, the communication control apparatus 11a allocates a PSCID that is not used in the mobile device.

The formation of cells and the grouping of the base stations 12a to 12f in the wireless communication system of FIG. 2 will be now described.

Figure 5:
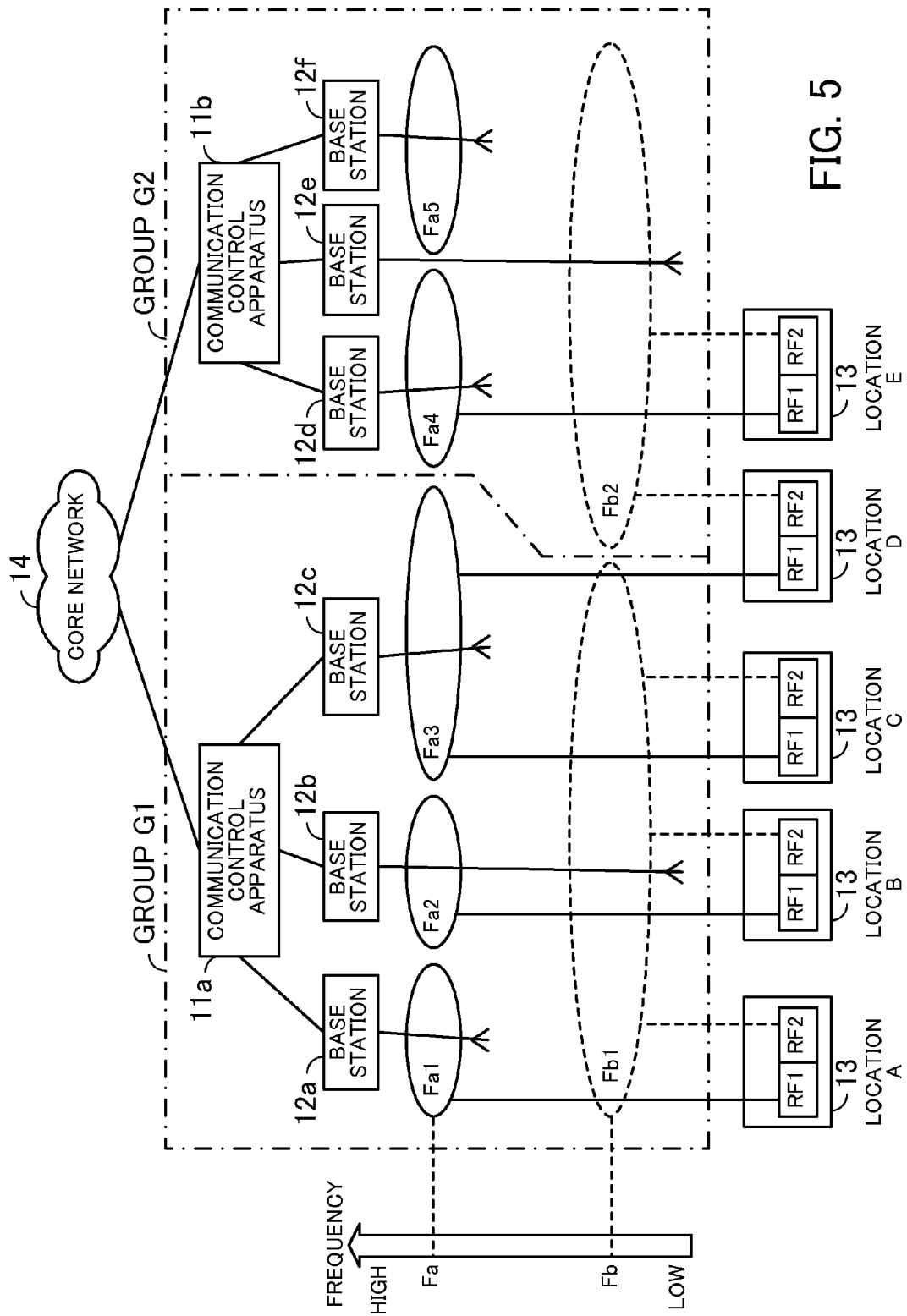
FIG. 5 is a diagram explaining the formation of cells and the grouping of base stations.

FIG. 5 is a diagram explaining the formation of cells and the grouping of the base stations. In FIG. 5, like reference signs are used to denote like elements also appearing in FIG. 2, and description of such elements is omitted. FIG. 5 also illustrates the mobile device 13 which may exist at any of locations A to E.

As illustrated in FIG. 5, the base station 12a radiates radio waves of the frequency band Fa over the area of the cell Fa1. The base station 12b radiates radio waves of the frequency band Fa over the area of the cell Fa2, and also radiates radio waves of the frequency band Fb over the area of the cell Fb1. The base station 12c radiates radio waves of the frequency band Fa over the area of the cell Fa3. The base station 12d radiates radio waves of the frequency band Fa over the area of the cell Fa4, the base station 12e radiates radio waves of the frequency band Fb over the area of the cell Fb2, and the base station 12f radiates radio waves of the frequency band Fa over the area of the cell Fa5. The frequency bands Fa and Fb are assumed to bear a frequency relationship of Fa>Fb. The cells Fa1 to Fa5, Fb1 and Fb2 can be formed as illustrated in FIG. 5 by controlling the transmission powers of the respective base stations, for example.

The mobile device 13 has wireless units (in FIG. 5, indicated by RF1 and RF2) for communicating wirelessly in the respective frequency bands Fa and Fb. The wireless unit RF1 communicates wirelessly in the frequency band Fa, and the wireless unit RF2 communicates wirelessly in the frequency band Fb. The lines extending from the base stations 12a to 12f and the lines extending from the wireless units RF1 and RF2 of the mobile device 13 signify what are represented by the similar lines already explained above with reference to FIG. 21, and therefore, explanation of the lines is omitted.

The base stations 12a to 12f are grouped in such a manner that a cell with a large cell radius accommodates a cell with a small cell radius. Also, the base stations 12a to 12f are grouped such that, where a cell with a small cell radius overlaps with a plurality of cells with large cell radii, the small cell is accommodated in that large cell with which a larger part of the small cell overlaps.

For example, the cell Fb1 accommodates the cells Fa1 to Fa3 having cell radii smaller than that of its own. Accordingly, the base stations 12a to 12c forming the cells Fa1 to Fa3 and Fb1 are grouped into one group G1. Also, the cell Fb2 accommodates the cells Fa4 and Fa5 having cell radii smaller than that of its own. Thus, the base stations 12d to 12f forming the cells Fa4, Fa5 and Fb2 are grouped into one group G2. The cell Fa3 overlaps with both the cells Fb1 and Fb2, but since the overlap of the cell Fa3 with the cell Fb1 is greater than the overlap of the cell Fa3 with the cell Fb2, the base station 12c is grouped into the group G1.

The communication control apparatuses 11a and 11b manage the identifiers (hereinafter referred to also as intra-base station identifiers) allocated uniquely within the base stations 12a to 12f, and allocate the identifiers so as to be unique within the respective groups G1 and G2. The base stations 12a to 12c belonging to the group G1, for example, are under the control of the communication control apparatus 11a. Thus, the communication control apparatus 11a allocates identifiers uniquely within the base stations 12a to 12c so that the allocated identifiers may be unique within the group G1. On the other hand, the base stations 12d to 12f belonging to the group G2 are under the control of the communication control apparatus 11b. Accordingly, the communication control apparatus 11b allocates identifiers uniquely within the base stations 12d to 12f so that the allocated identifiers may be unique within the group G2. Also, the communication control apparatuses 11a and 11b allocate an identifier (hereinafter referred to also as intra-mobile device identifier) uniquely within the mobile device 13.

If the mobile device 13 moves and connects to those two of the cells Fa1 to Fa5, Fb1 and Fb2 which belong to the different groups G1 and G2, the communication control apparatuses 11a and 11b allocate the mobile device 13 an intra-base station identifier that is unused in the groups G1 and G2. Specifically, the communication control apparatuses 11a and 11b of the different groups G1 and G2, which manage the base stations 12a to 12f, communicate with each other to negotiate an unused intra-base station identifier and allocate the unused intra-base station identifier to the mobile device 13.

On the other hand, if the mobile device 13 which has been connected to base stations of the different groups G1 and G2 ceases to connect to one of the groups G1 and G2, the communication control apparatus 11a or 11b of the group G1 or G2 which the mobile device 13 no longer connects to releases the intra-base station identifier allocated to the mobile device 13 until then.

Let it be assumed that, in FIG. 5, the mobile device 13 is powered on at the location A, for example, and enters the network of the wireless communication system. In the following description, the SID is exemplified as the intra-base station identifier.

Since the mobile device 13 has entered the network, the communication control apparatus 11a allocates the mobile device 13 an SID unique within the group G1. Let us suppose that the SID "1", for example, is allocated to the mobile device 13 by the communication control apparatus 11a. When the mobile device 13 exists at the location A, the targets of connection of the wireless units RF1 and RF2 of the mobile device 13 are the base stations 12a and 12b, respectively.

If the mobile device 13 moves from the location A to the location B, the target of connection of the wireless unit RF2 of the mobile device 13 remains unchanged, namely, the base station 12b, despite the movement from the location A to the location B, but the target of connection of the wireless unit RF1 changes from the base station 12a to the base station 12b. Since the mobile device 13 has been allocated the SID unique within the group G1, the SID need not be reallocated because, despite the change of the target base station, the new target base station belongs to the same group G1. Consequently, the SID "1" of the mobile device 13 remains the same.

Let it be assumed that the mobile device 13 moves from the location B to the location C. In this case, the target of connection of the wireless unit RF2 of the mobile device 13 remains unchanged, namely, the base station 12b, despite the movement from the location B to the location C, but the target of connection of the wireless unit RF1 changes from the base station 12b to the base station 12c. Like the movement from the location A to the location B, the movement from the location B to the location C is movement within the same group G1. Since the mobile device 13 has been allocated the SID unique within the group G1, the SID need not be reallocated because, despite the change of the target base station, the new target base station belongs to the same group G1. Accordingly, the SID "1" of the mobile device 13 remains the same.

If the mobile device 13 moves from the location C to the location D, the target of connection of the wireless unit RF1 of the mobile device 13 remains unchanged, namely, the base station 12c of the group G1, but the target of connection of the wireless unit RF2 changes from the base station 12b to the base station 12e, so that the mobile device 13 straddles the groups G1 and G2. In this case, since the mobile device 13 is connected to the base stations of the different groups G1 and G2, the communication control apparatuses 11a and 11b allocate the mobile device 13 an SID which is unused in the groups G1 and G2. If the SID "2" is unused in the groups G1 and G2, for example, the communication control apparatus 11a allocates the SID "2" to the mobile device 13.

Let us suppose that the mobile device 13 moves from the location D to the location E. In this case, the target of connection of the wireless unit RF2 of the mobile device 13 remains unchanged, namely, the base station 12e of the group G2, but the target of connection of the wireless unit RF1 changes from the base station 12c of the group G1 to the base station 12d of the group G2.

Because of the movement from the location D to the location E, the targets of connection of the mobile device 13 change to the base stations 12d and 12e both belonging to the group G2. When the mobile device 13 moved from the location C to the location D, however, the SID "2" not used in the group G2 was allocated to the mobile device 13, and therefore, the SID need not be reallocated by the communication control apparatuses 11a and 11b despite the movement of the mobile device 13 from the location D to the location E. Also, since the mobile device 13 is connected to the base stations 12d and 12e belonging to the group G2, the group G1 may release the SID "2" so that the SID "2" can be allocated to another mobile device in the group G1.

Figure 6:
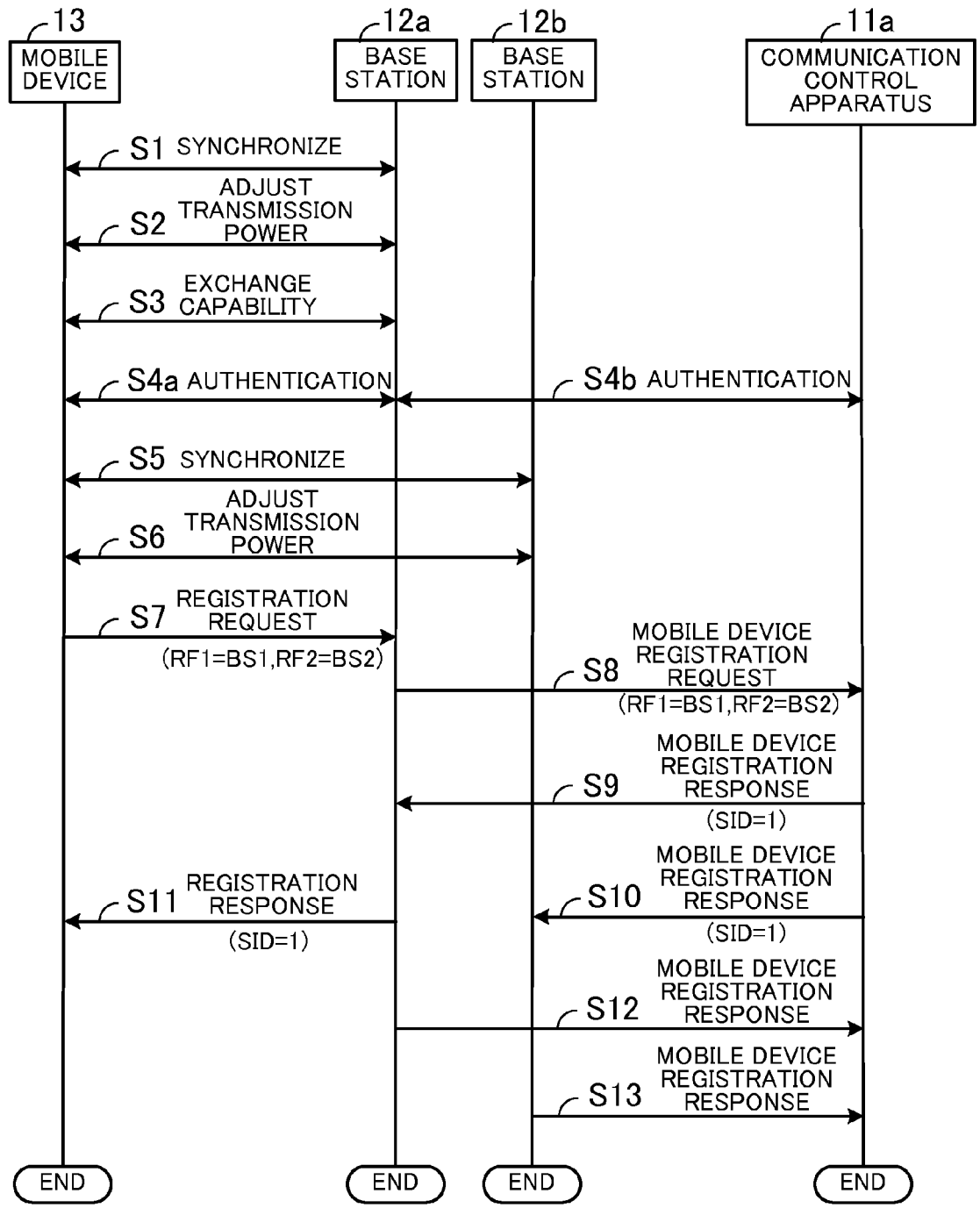
FIG. 6 is a sequence diagram illustrating the network entry of a mobile device.

FIG. 6 is a sequence diagram illustrating the network entry of a mobile device. Specifically, FIG. 6 illustrates a sequence of operations of the mobile device 13, the base stations 12a and 12b and the communication control apparatus 11a, all appearing in FIG. 5. It is assumed here that the mobile device 13 enters the network at the location A illustrated in FIG. 5.

In Step S1, the mobile device 13 synchronizes with the base station 12a (Synchronize).

In Step S2, the mobile device 13 adjusts the transmission power in cooperation with the base station 12a (Adjust transmission power).

In Step S3, the mobile device 13 and the base station 12a exchange information about the mutually supported capability (Exchange capability).

In Steps S4a and S4b, the communication control apparatus 11a authenticates the mobile device 13 via the base station 12a (Authentication).

In Step S5, the mobile device 13 synchronizes with the base station 12b (Synchronize).

In Step S6, the mobile device 13 adjusts the transmission power in cooperation with the base station 12b (Adjust transmission power).

In Step S7, the mobile device 13 transmits a registration request (REG-REQ) to the base station 12a, in order to request registration thereof with the wireless communication network. When transmitting the registration request, the mobile device 13 specifies the base stations to which the wireless units RF1 and RF2 are to be connected. In the example illustrated in FIG. 5, the base station 12a (in FIG. 6, BS1) is specified as the target of connection of the wireless unit RF1, and the base station 12b (in FIG. 6, BS2) is specified as the target of connection of the wireless unit RF2. Thus, the registration request transmitted from the mobile device 13 includes information indicating RF1=BS1 and RF2=BS2, for example.

In Step S8, the base station 12a forwards the registration request received from the mobile device 13 to the communication control apparatus 11a. For example, the base station 12a uses an MS_Attachment_Req message to forward the registration request received from the mobile device 13 to the communication control apparatus 11a.

In Step S9, the communication control apparatus 11a acquires an SID which is unused and unique within the group G1. Let us suppose that the communication control apparatus 11a acquires the SID "1", for example. In this case, the communication control apparatus 11a transmits the SID "1" to the base station 12a, which is one of the targets of connection of the mobile device 13. The communication control apparatus 11a uses an MS_Attachment_Rsp message, for example, to transmit the acquired SID to the base station 12a.

In Step S10, the communication control apparatus 11a transmits the SID "1", acquired in Step S9, to the base station 12b, which is the other target of connection of the mobile device 13. Using the MS_Attachment_Rsp message, for example, the communication control apparatus 11a transmits the acquired SID "1" to the base station 12b.

In Step S11, the base station 12a transmits, to the mobile device 13, a response (REG-RSP: Registration Response) to the registration request. At this time, the base station 12a transmits the SID "1" received from the communication control apparatus 11a to the mobile device 13.

In Step S12, the base station 12a sends back a mobile device registration response to the communication control apparatus 11a. The base station 12a uses, for example, an MS_Attachment_Ack message to send back the mobile device registration response to the communication control apparatus 11a.

In Step S13, the base station 12b sends back a mobile device registration response to the communication control apparatus 11a. Using the MS_Attachment_Ack message, for example, the base station 12b sends back the mobile device registration response to the communication control apparatus 11a.

The above sequence of operations makes it possible to allocate the mobile device 13 an SID unique within the group G1.

In Steps S1 to S6, the synchronization and transmission power adjustment of the wireless unit RF1 of the mobile device 13 are performed earlier than those of the wireless unit RF2, but the synchronization and transmission power adjustment of the wireless units RF1 and RF2 may be executed simultaneously or in the reverse order. Also, although the wireless unit RF1 of the mobile device 13 exchanges messages to carry out the exchange of capability and the authentication, the wireless unit RF2 may exchange such messages instead.

Further, the base stations 12a and 12b, which are the targets of connection of the mobile device 13, both receive the SID from the communication control apparatus 11a (Steps S9 and S10). Also, in the sequence diagram of FIG. 6, that one of the base stations 12a and 12b which has received the registration request, namely, the base station 12a transmits the SID received from the communication control apparatus 11a to the mobile device 13. Alternatively, the base station 12b may transmit the SID received from the communication control apparatus 11a to the mobile device 13. In this case, the mobile device 13 receives the SID from the base station 12b via the wireless unit RF2.

Figure 7:
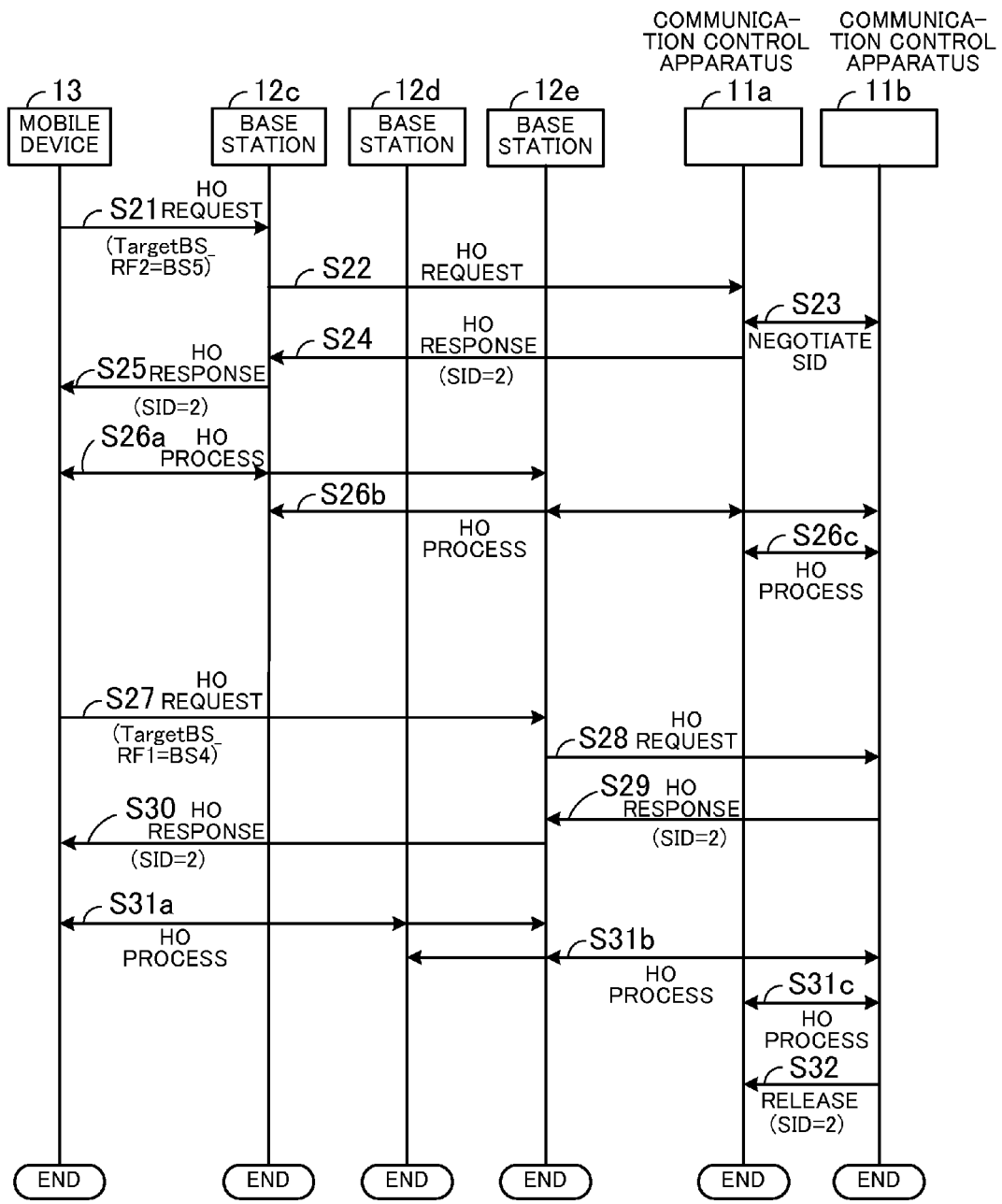
FIG. 7 is a sequence diagram illustrating handovers executed in the wireless communication system.

FIG. 7 is a sequence diagram illustrating handovers executed in the wireless communication system. Specifically, FIG. 7 illustrates a sequence of operations of the mobile device 13, the base stations 12c to 12e and the communication control apparatuses 11a and 11b, all appearing in FIG. 5. In FIG. 7, a handover sequence is illustrated wherein the mobile device 13 is moved from the location C to the location D and then from the location D to the location E, illustrated in FIG. 5.

In Step S21, the mobile device 13 moves from the location C to the location D, and therefore, the target of connection of the wireless unit RF2 needs to be changed from the base station 12b to the base station 12e. In order to change the target of connection of the wireless unit RF2 to the base station 12e, the mobile device 13 sends a handover (HO) request to the base station 12c, which is the target of connection of the wireless unit RF1. The mobile device 13 sends the handover request to the base station 12c by including, in an MOB_MSHO-REQ message, for example, information (e.g., "TargetBS_RF2=BS5" (BS5 represents the base station 12e)) to the effect that the target of connection of the wireless unit RF2 is to be changed to the base station 12e.

In Step S22, the base station 12c receives the handover request from the mobile device 13 and sends a handover request to the communication control apparatus 11a which controls the base station 12c. The base station 12c transmits the handover request to the communication control apparatus 11a by including the information "TargetBS_RF2=BS5" in an HO_Req message, for example.

In Step S23, the communication control apparatus 11a negotiates an unused SID with the communication control apparatus 11b responsible for the allocation of SIDs in the group G2 to which the target of connection of the wireless unit RF2 after the handover, namely, the base station 12e, belongs. It is assumed here that the SID "2", for example, is not used in the communication control apparatuses 11a and 11b.

In Step S24, the communication control apparatus 11a sends a handover (HO) response to the base station 12c. The communication control apparatus 11a transmits the handover response by including, in an HO-Rsp message, for example, information indicating the SID "2" obtained as a result of the negotiation with the communication control apparatus 11b.

In Step S25, the base station 12c sends a handover response to the mobile device 13. The base station 12c transmits the handover response by including the information "SID=2" in an MOB_BSHO-RSP message, for example. The process up to Step S24 is a pre-allocation process in a handover (HO) Preparation Phase, and the SID "2" is actually used following a handover (HO) Action Phase in Steps S26a to S26c.

In Steps S26a to S26c, the mobile device 13, the base stations 12c and 12e and the communication control apparatuses 11a and 11b execute a handover (HO) process by exchanging handover control messages. As a result, the target of connection of the wireless unit RF2 of the mobile device 13 is changed to the base station 12e. The target of connection of the wireless unit RF1 of the mobile device 13 remains unchanged and therefore, is the base station 12c.

In Step S27, the mobile device 13 moves from the location D to the location E. Because of the movement of the mobile device 13, the target of connection of the wireless unit RF1 needs to be changed to the base station 12d. In order to change the target of connection of the wireless unit RF1 to the base station 12d, the mobile device 13 sends a handover request to the base station 12e to which the wireless unit RF2 is connected. The mobile device 13 transmits the handover request to the base station 12e by including, in the MOB_MSHO-REQ message, for example, the information "TargetBS_RF1=BS4" (BS4 represents the base station 12d).

In Step S28, the base station 12e receives the handover request from the mobile device 13 and sends a handover request to the communication control apparatus 11b which manages the base station 12e. The base station 12e transmits the handover request to the communication control apparatus 11b by including the information "TargetBS_RF1=BS4" in the HO-Req message, for example.

In Step S29, the communication control apparatus 11b sends a handover response to the base station 12e. With respect to the group G2 to which the target of connection after the handover, namely, the base station 12d, belongs, the SID "2" unique within the group G2 has already been allocated to the mobile device 13, and therefore, the communication control apparatus 11b transmits the already allocated SID "2" to the base station 12e. In this case, the communication control apparatus 11b sends the handover response to the base station 12e by including the information "SID=2" in the HO-Rsp message, for example. The communication control apparatus 11b stores information indicating that the wireless units RF1 and RF2 of the mobile device 13 are connected to the base stations both belonging to the group G2 and have no connection with the group G1.

In Step S30, the base station 12e sends a handover response to the mobile device 13. The base station 12e transmits the handover response by including, in the MOB_BSHO-RSP message, for example, the SID "2" already allocated to the mobile device 13.

In Steps S31a to S31c, the mobile device 13, the base stations 12d and 12e and the communication control apparatuses 11a and 11b perform a handover process by exchanging handover control messages. As a consequence, the target of connection of the wireless unit RF1 of the mobile device 13 is changed to the base station 12d. The target of connection of the wireless unit RF2 of the mobile device 13 remains unchanged and therefore, is the base station 12e.

In Step S32, the communication control apparatus 11b, which holds the information that the mobile device 13 has no connection with the group G1, notifies the communication control apparatus 11a to release the SID "2" used in the group G1 until then.

Thus, the mobile device 13 can continuously use the same SID "2" as before the handover. In the group G1 to which the mobile device 13 no longer belongs, the SID "2" is released so that the SID "2" may be allocated to another mobile device.

In Step S21, the mobile device 13 sends the handover request to the base station 12c to which the wireless unit RF1 is connected. Alternatively, the handover request may be transmitted to the base station 12b to which the wireless unit RF2 is connected. In this case, the handover messages are exchanged via the base station 12b.

Similarly, in Step S27, the mobile device 13 transmits the handover request to the base station 12e to which the wireless unit RF2 is connected. The handover request may alternatively be sent to the base station 12c to which the wireless unit RF1 is connected. In this case, the handover messages are exchanged via the base station 12c.

Also, in the foregoing explanation, the communication control apparatus 11b requests the communication control apparatus 11a to release the identifier. Alternatively, on recognizing the completion of the handover process, the communication control apparatus 11a may release the intra-base station identifier and intra-mobile device identifier allocated to the mobile device 13 until then.

Figure 8:
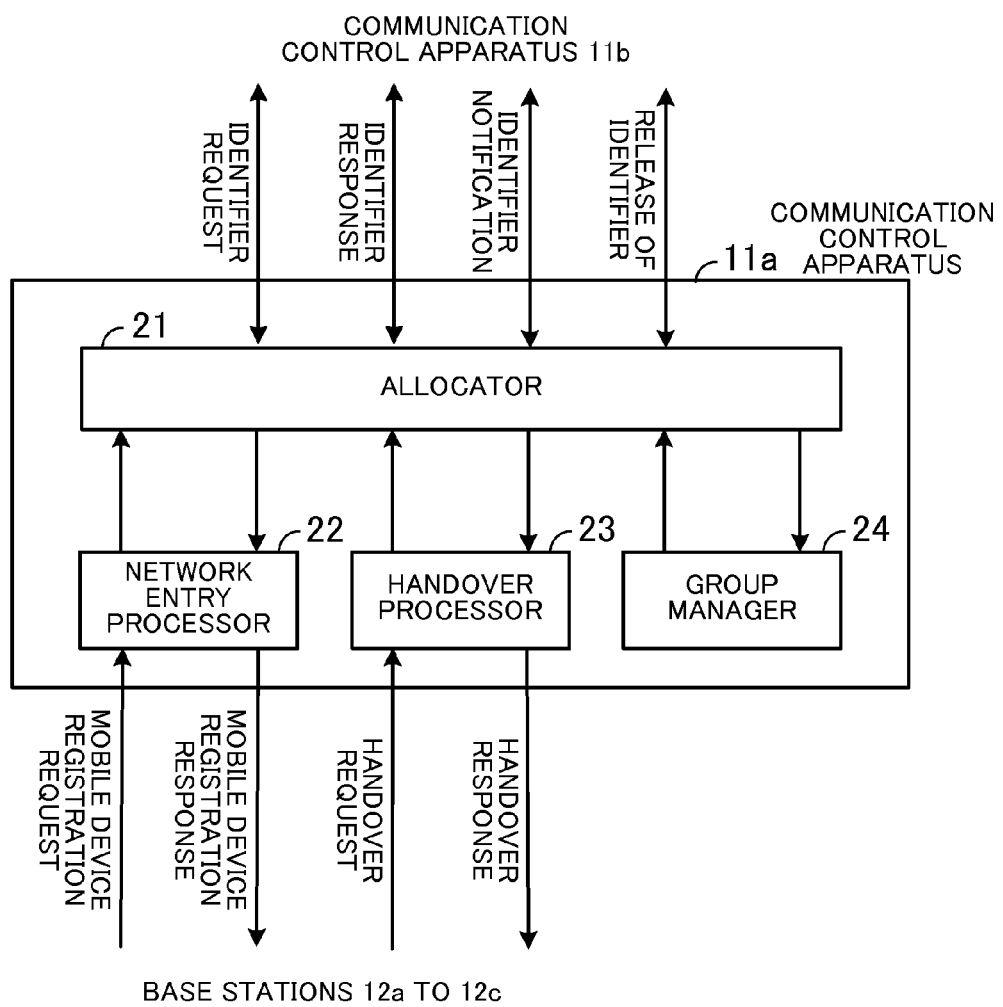
FIG. 8 is a block diagram of a communication control apparatus.

FIG. 8 is a block diagram of the communication control apparatus. As illustrated in FIG. 8, the communication control apparatus 11a includes an allocator 21, a network entry processor 22, a handover processor 23, and a group manager 24. The allocator 21 corresponds to the allocator 1a in FIG. 1, for example, and the network entry processor 22 and the handover processor 23 correspond to the transmitter 1b.

The allocator 21 has an identifier management table, and the group manager 24 has a group management table. These tables will be explained first.

FIG. 9 illustrates an exemplary data structure of the identifier management table. As illustrated in FIG. 9, the identifier management table 21a held by the allocator 21 has columns named "Identifier type", "Used value", "Mobile device" and "Connected base stations".

Under the "Identifier type" column, the types of the intra-base station identifier and intra-mobile device identifier allocated to the mobile device 13 are registered. For example, "SID", "CID", "SLPID", "PSCID" and the like are registered. Under the "Used value" column, the allocated value of the identifier whose type is specified in the corresponding "Identifier type" field is registered. Under the "Mobile device" column, the MAC address of the mobile device to which the identifier is allocated is registered. Under the "Connected base stations" column, information about the base stations to which the identifier-allocated mobile device is connected is registered.

Let it be assumed, for example, that the SID "2" is allocated to the mobile device 13 and that the wireless units RF1 and RF2 of the mobile device 13 are connected to the base station (base station 12c) and the base station 5 (base station 12e), respectively. In this case, as seen from the top row but the heading row in FIG. 9, "SID" is registered in the "Identifier type" field, and the SID value "2" allocated to the mobile device 13 is registered in the "Used value" field. The MAC address of the mobile device 13 is registered in the "Mobile device" field, and RF1=Base station 3 (indicating that the wireless unit RF1 is connected to the base station 3) and RF2=Base station 5 are registered in the "Connected base stations" field.

The allocator 21 manages the identifier management table 21a and looks up the identifier management table 21a to ascertain what identifier type and what identifier value have been allocated to which mobile device and to which base stations the mobile device is connected, for example.

FIG. 10 illustrates an exemplary data structure of the group management table. As illustrated in FIG. 10, the group management table 24a held by the group manager 24 has columns named "Base station", "Group", and "Communication control apparatus".

Under the "Base station" column, information about the base stations 12a to 12f constituting the wireless communication network is registered. In FIG. 10, the base stations 1 to 6 respectively correspond to the base stations 12a to 12f illustrated in FIG. 5. Under the "Group" column, information about the group to which the base station identified in the corresponding "Base station" field belongs is registered. Under the "Communication control apparatus" column, information about the communication control apparatus which supervises the base station identified in the corresponding "Base station" field is registered. In FIG. 10, the communication control apparatuses 1 and 2 respectively correspond to the communication control apparatuses 11a and 11b illustrated in FIG. 5. The group management table 24a is generated when the base stations are installed, for example.

By looking up the group management table 24a illustrated in FIG. 10, it is possible to ascertain, for example, that the base station 1 (base station 12a) belongs to the group G1 and is under the control of the communication control apparatus 1.

Referring again to FIG. 8, the allocator 21 sends the registration request from the mobile device 13, which has been received by the network entry processor 22, to the group manager 24. As a response to the registration request, the allocator 21 receives, from the group manager 24, information about the group of the base stations 12a to 12c or 12d to 12f to which the mobile device 13 requesting the network entry belongs as well as information about the communication control apparatus 11a or 11b that controls the base station group.

Based on the information about the group of the base stations 12a to 12c or 12d to 12f and the communication control apparatus 11a or 11b controlling the group, received from the group manager 24, the allocator 21 determines whether to negotiate with the other communication control apparatus 11b for an unused common intra-base station identifier. For example, when the mobile device 13 is requesting network entry such that the wireless units RF1 and RF2 thereof are to be connected to those of the base stations 12a to 12f which belong to the different groups G1 and G2, the allocator 21 decides to negotiate with the other communication control apparatus 11b for an unused common intra-base station identifier.

In the exemplary sequence illustrated in FIG. 6, the mobile device 13 transmits the registration request including the information "RF1=BS1" and "RF2=BS2" to the communication control apparatus 11a. The allocator 21 sends the received information to the group manager 24 and receives, as a response from the group manager 24, information about the group G1 including the base stations 12a and 12b to which the mobile device 13 is to be connected, and information about the communication control apparatus 11a which controls the base stations 12a and 12b. It is the communication control apparatus 11a itself that is responsible for the allocation of the intra-base station identifiers in the group G1, and therefore, the communication control apparatus 11a does not negotiate with the other communication control apparatus 11b.

The allocator 21 looks up the identifier management table 21a and acquires an unused intra-base station identifier. Where it is unnecessary to negotiate with the other communication control apparatus 11b, the allocator 21 allocates the acquired unused intra-base station identifier to the mobile device 13. On the other hand, if it is necessary to negotiate with the other communication control apparatus 11b, the allocator 21 negotiates with the other communication control apparatus 11b to determine whether or not the acquired unused intra-base station identifier is also not used in the other communication control apparatus 11b. If the acquired unused intra-base station identifier is already used in the other communication control apparatus 11b, the allocator 21 acquires another unused intra-base station identifier and again negotiates with the other communication control apparatus 11b.

Then, the allocator 21 stores information about the intra-base station identifier allocated to the mobile device 13 in the identifier management table 21a. For example, the allocator 21 stores information about the type of the intra-base station identifier allocated to the mobile device 13, the used value, the MAC address of the mobile device 13 and the connected base stations, in the identifier management table 21a. Subsequently, the allocator 21 sends, to the network entry processor 22, the intra-base station identifier allocated to the mobile device 13. Where the unused intra-base station identifier was negotiated between the communication control apparatuses 11a and 11b, the allocator of the communication control apparatus 11b stores, in its identifier management table, information about the unused identifier and the mobile device 13.

In the foregoing, explanation is directed to the operation of the allocator 21 at the time of network entry (SID allocation). CID and SLPID are also allocated to the mobile device 13 in like manner but at timings different from the network entry of the mobile device 13, that is, at the time the mobile device 13 establishes a new connection, and at the time the mobile device 13 enters the sleep mode, respectively.

Also, the allocator 21 allocates an intra-mobile device identifier to the mobile device 13 by performing a process similar to that for allocating the intra-base station identifier. Since the intra-mobile device identifiers are allocated by the communication control apparatuses 11a and 11b, the allocation of the intra-base station identifiers and the allocation of the intra-mobile device identifiers can be centralized in the communication control apparatuses 11a and 11b.

When the handover request is received from the handover processor 23, the allocator 21 looks up the identifier management table 21a to acquire the information about that one of the base stations 12a to 12f which remains connected in spite of the handover and the information about that one of the base stations 12a to 12f to which the mobile device is to be connected anew after the handover. The allocator 21 sends the acquired information about the identified base stations among the base stations 12a to 12f to the group manager 24.

In the exemplary sequence illustrated in FIG. 7, where the mobile device 13 moves from the location C to the location D, for example, the base station which remains connected, among the base stations 12a to 12f, in spite of the handover is the base station 12c (base station 3), and the base station to which the mobile device 13 is newly connected, among the base stations 12a to 12f, after the handover is the base station 12e (base station 5). Thus, in the exemplary sequence of FIG. 7, the allocator 21 sends the information about the base stations 3 and 5 to the group manager 24.

The allocator 21 then receives, from the group manager 24, information about the group or groups G1 and G2 to which the base stations connected after the handover belong, and information about the communication control apparatus 11a or 11b or both responsible for the allocation of the identifiers in the group or groups G1 and G2. If the target base stations to which the mobile device 13 is connected belong to the different groups G1 and G2, the allocator 21 determines based on the information received from the group manager 24 whether to negotiate with the other communication control apparatus 11b for an unused intra-base station identifier. For example, if one of the base stations to which the mobile device 13 is connected after the handover belongs to the other group and the other communication control apparatus takes the responsibility for allocating the identifiers in that group, the allocator 21 decides to negotiate an unused identifier. In the exemplary sequence of FIG. 7, the base station 3 belongs to the group G1 and the identifiers in this group are allocated by the communication control apparatus 11a, whereas the base station 5 belongs to the group G2 and the identifiers in this group are allocated by the communication control apparatus 11b. Thus, in this case, the allocator 21 decides to negotiate an unused identifier.

When negotiating with the other communication control apparatus 11b, the allocator 21 transmits, to the other communication control apparatus 11b, the intra-base station identifier already allocated to the mobile device 13. This is done to minimize the possibility of the intra-base station identifier being changed. If the intra-base station identifier is already used in the communication control apparatus 11b, another unused intra-base station identifier is negotiated.

The allocator 21 stores information about the intra-base station identifier allocated to the mobile device 13, in the identifier management table 21a. For example, the allocator 21 stores, in the identifier management table 21a, the information about the type of the intra-base station identifier allocated, the used value, the MAC address of the mobile device 13, and the connected base stations. Also, the allocator 21 sends, to the handover processor 23, the intra-base station identifier allocated to the mobile device 13.

On the other hand, if it is judged from the information acquired from the group manager 24 that because of movement of the mobile device 13, the connection of the mobile device 13 will change from a state in which the mobile device 13 belongs to the multiple groups G1 and G2 to a state in which the mobile device 13 ceases to connect to one of the groups G1 and G2, the allocator 21 recognizes that the mobile device 13 will no longer belong to the group G1 or G2 to which the mobile device 13 is connected before the handover, and stores information to that effect in a storage such as memory. On receiving a notification from the handover processor 23 that the handover is completed, the allocator 21 notifies the communication control apparatus 11a or 11b responsible for the allocation of the identifiers in the group G1 or G2 to which the mobile device 13 belonged before the handover, to release the intra-base station identifier. When the notification to release the identifier is received, the allocator of the communication control apparatus 11a or 11b removes the intra-base station identifier included in the notification from the identifier management table.

In the exemplary sequence illustrated in FIG. 7, for example, if the mobile device 13 moves from the location D to the location E, the allocator of the communication control apparatus 11b recognizes that the mobile device 13 will come to have no connection with the group G1 to which the mobile device 13 belongs before the handover, and holds information about the upcoming state. When the handover process is finished, the allocator of the communication control apparatus 11b sends a notification to the communication control apparatus 11a to instructs same to release the SID "2". The allocator 21 of the communication control apparatus 11a deletes the SID "2" from the identifier management table 21a.

As for the intra-mobile device identifier, even if the mobile device 13 becomes connected to base stations of the multiple groups G1 and G2 due to handover, the communication control apparatuses 11a and 11b need not negotiate with each other over an unused intra-mobile device identifier, and the intra-mobile device identifier already allocated to the mobile device 13 has only to be notified. In the exemplary sequence of FIG. 7, for example, the mobile device 13 moves from the location C to the location D, and because of the handover, the mobile device 13 is newly connected to the base station 12e of the group G2. In this case, the allocator 21 of the communication control apparatus 11a transmits the already allocated intra-mobile device identifier to the allocator of the communication control apparatus 11b, which manages the base station 12e, so that the allocator of the communication control apparatus 11b may not allocate a used intra-mobile device identifier to the mobile device 13. The allocator of the communication control apparatus 11b registers the intra-mobile device identifier received from the allocator 21 of the communication control apparatus 11a, in the identifier management table as the used identifier.

The network entry processor 22 receives a registration request for network entry from the mobile device 13 via one of the base stations 12a to 12c. Then, the network entry processor 22 sends the received registration request to the allocator 21. Also, the network entry processor 22 transmits, to the corresponding one of the base stations 12a to 12c, the intra-base station identifier and intra-mobile device identifier acquired by the allocator 21 and allocated to the mobile device 13.

The handover processor 23 receives a handover request from the mobile device 13 via one of the base stations 12a to 12c. Then, the handover processor 23 sends the received handover request to the allocator 21. Also, the handover processor 23 transmits, to the corresponding one of the base stations 12a to 12c, the intra-base station identifier acquired by the allocator 21 and allocated to the mobile device 13.

Based on the registration request of the mobile device 13 received from the allocator 21, the group manager 24 looks up the group management table 24a. The registration request includes information about the base station to which the mobile device 13 is moving. The group manager 24 acquires information about the groups G1 and G2 which the individual connected base stations, among the base stations 12a to 12f, belong to, and information about the communication control apparatuses 11a and 11b responsible for the allocation of the intra-base station identifiers or the intra-mobile device identifiers in the groups G1 and G2. Then, the group manager 24 sends the acquired information about the groups G1 and G2 and the communication control apparatuses 11a and 11b to the allocator 21.

Also, the group manager 24 receives, from the allocator 21, information about the base station which, among the base stations 12a to 12f, remains connected in spite of the handover as well as information about the base station to which the mobile device 13 is newly connected, among the base stations 12a to 12f, after the handover. On receiving the information about the connected base stations, the group manager 24 looks up the group management table 24a to acquire information about the group or groups G1 and G2 to which the individual connected base stations belong as well as information about the communication control apparatus 11a or 11b or both responsible for the allocation of the identifiers in the group or groups G1 and G2, and sends the acquired information to the allocator 21.

Figure 11:
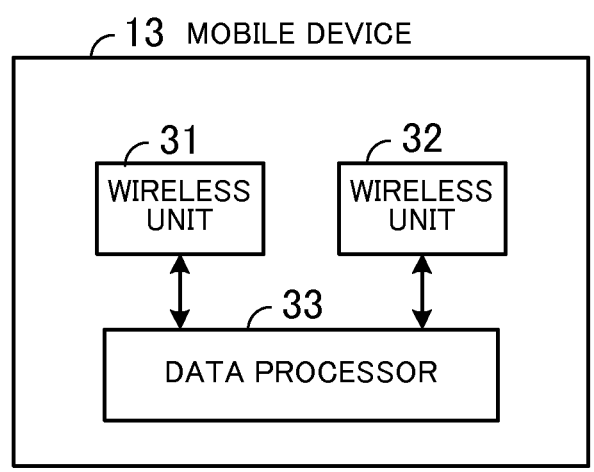
FIG. 11 is a block diagram of the mobile device.

FIG. 11 is a block diagram of the mobile device. As illustrated in FIG. 11, the mobile device 13 includes wireless units 31 and 32, and a data processor 33. The wireless units 31 and 32 illustrated in FIG. 11 correspond to the wireless units RF1 and RF2, respectively, of the mobile device 13 illustrated in FIG. 5.

The wireless units 31 and 32 convert data output from the data processor 33 to radio signals of the frequency bands Fa and Fb, respectively, and transmit the radio signals wirelessly to the base stations 12a to 12f. Also, the wireless units 31 and 32 convert radio signals of the respective frequency bands Fa and Fb, received from the base stations 12a to 12f, into a form of data that can be processed by the data processor 33, and output the converted data. The data processor 33 processes data exchanged with other mobile devices, for example.

As described above, the base stations 12a to 12f are divided into the groups G1 and G2 in such a manner that a large cell accommodates a small cell. The communication control apparatuses 11a and 11b allocate the intra-base station identifiers so as to be unique within the respective groups G1 and G2. Accordingly, the communication control apparatuses 11a and 11b need not reallocate the intra-base station identifier to the mobile device 13 each time the mobile device 13 moves from one base station to another within their respective groups G1 and G2.

Thus, the number of times the intra-base station identifiers need to be reallocated can be reduced, whereby adverse influence upon the wireless communication can be restrained.

Further, since the number of times the intra-base station identifiers need to be reallocated can be reduced, it is possible to reduce the bandwidth required by messages exchanged at the time of reallocation.

In the next-generation standard, the bit length of the intra-base station identifiers is standardized so as to have a sufficient length that allows the intra-base station identifiers to be allocated uniquely to mobile devices existing in at least one large cell. Accordingly, even if the intra-base station identifiers are allocated uniquely within a group in which a large cell accommodates small cells, a situation where the intra-base station identifiers run short does not occur, proving that such grouping is appropriate in terms of size.

Further, since the intra-mobile device identifiers are allocated by the communication control apparatuses 11a and 11b, the identifier allocation processes can be centralized in the communication control apparatuses 11a and 11b.

Although in FIG. 5, the communication control apparatuses 11a and 11b are installed with respect to the groups G1 and G2, respectively, the single communication control apparatus 11a, for example, may be installed for the groups G1 and G2 to allocate the identifiers including the intra-base station identifiers and the intra-mobile device identifiers within the multiple groups G1 and G2.

Furthermore, in FIG. 5, the boundary (in FIG. 5, between the base stations 12c and 12d) of the base stations 12a to 12f managed by the communication control apparatuses 11a and 11b coincides with the boundary of the groups G1 and G2, but the boundary of the groups G1 and G2 may extend beyond the management boundary of the communication control apparatuses 11a and 11b managing the base stations 12a to 12f. For example, the boundary of the groups G1 and G2 may extend up to the boundary of the base stations 12d and 12e. In this case, multiple communication control apparatuses are involved in the management of a base station belonging to a certain group. One of the communication control apparatuses is selected as a master communication control apparatus responsible for the allocation of the identifiers, while the other communication control apparatus is caused to act as relay communication control apparatuses for relaying messages exchanged between the master communication control apparatus and the base stations, whereby the identifier allocation process can be executed in substantially the same manner as described above.

Also, in the foregoing embodiment, the mobile device 13 has two wireless units RF1 and RF2. Thus, a maximum number of cells to which the mobile device 13 can be simultaneously connected is two, and the number of groups to which the mobile device 13 can simultaneously belong is two. Alternatively, the mobile device 13 may be provided with three or more wireless units RF. In this case, the mobile device 13 can be simultaneously connected to three or more cells and can simultaneously belong to three or more groups. By negotiating an unused identifier among three or more groups and notifying the individual groups of the allocated identifier, however, it is possible to allocate an appropriate identifier to the mobile device 13 in the same manner as described above.

In the foregoing embodiment, moreover, the communication control apparatus takes the responsibility for allocating the intra-base station identifiers and the intra-mobile device identifiers. Alternatively, the function of the communication control apparatus may be performed by a plurality of base stations and messages may be exchanged between the base stations to allocate the intra-base station identifiers and the intra-mobile device identifiers to the mobile devices.

A second embodiment will be now described in detail with reference to the drawings. In the second embodiment, the groups of bases stations are accommodated in a larger group, and the identifiers are allocated so as to be unique within the larger group.

Figure 12:
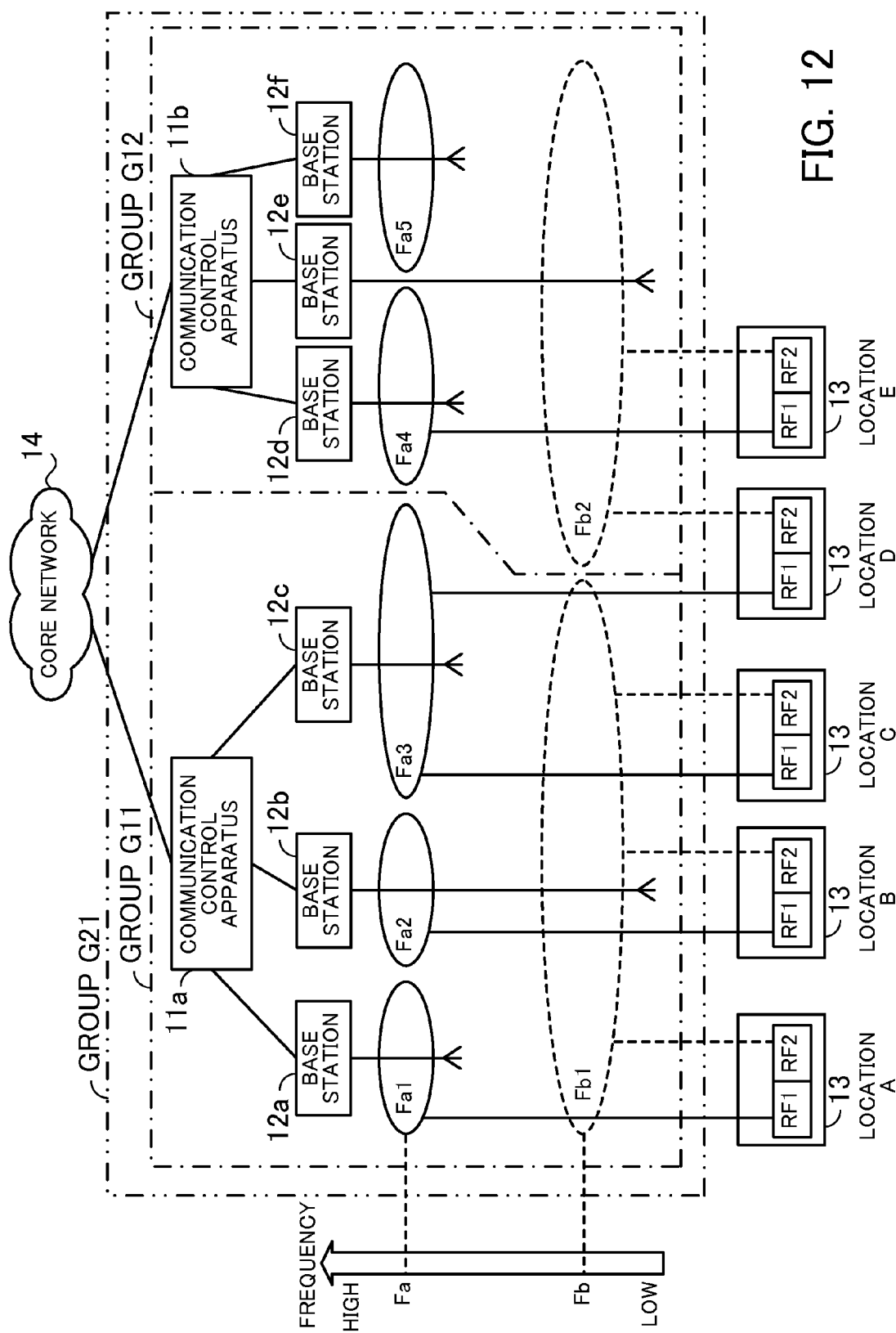
FIG. 12 is a diagram explaining the formation of cells and the grouping of base stations according to a second embodiment.

FIG. 12 is a diagram explaining the formation of cells and the grouping of base stations according to the second embodiment. In FIG. 12, like reference signs are used to denote like elements also appearing in FIG. 5, and description of such elements is omitted.

Groups G11 and G12 illustrated in FIG. 12 respectively correspond to the groups G1 and G2 illustrated in FIG. 5. Specifically, in the example of FIG. 12, the base stations 12a to 12f are grouped in such a manner that a cell with a large cell radius accommodates cells with small cell radii, as in the example of FIG. 5. Also, a group G21 accommodating the groups G11 and G12 is formed, as seen from FIG. 12. In the following, the groups G11 and G12 are referred to as group class C1, and the large group G21 accommodating the groups G11 and G12 is referred to as group class C2.

In FIG. 12, the SID, for example, is managed within the scope of the large group G21 accommodating the groups G11 and G12, while the CID and the SLPID are individually managed within the scopes of the groups G11 and G12, as in the first embodiment. This is because the SID has a relatively long bit length and thus has spare space for additional values. That is, the SID permits a large number of different identifiers to be allocated to respective mobile devices. Other types of intra-base station identifiers may of course be managed within the scope of the group G21.

The following describes the case where the SIDs are managed within the scope of the group G21 (group class C2) and the other intra-base station identifiers and the intra-mobile device identifiers are individually managed within the scopes of the groups G11 and G12 (group class C1). The management of the identifiers in the group class C1 is identical with the management carried out in the first embodiment, and therefore, description thereof is omitted.

First, a communication control apparatus responsible for the allocation of SIDs is selected from among those in the group G21 of the group class C2. Let it be assumed that the communication control apparatus 11a, for example, is responsible for the allocation of SIDs.

At the location A, for example, the mobile device 13 is powered on and enters the network of the wireless communication system. In this case, the communication control apparatus 11a, which is responsible for the allocation of SIDs in the group class C2, allocates the mobile device 13 an SID unique within the group G21. For example, the communication control apparatus 11a allocates the SID "1" to the mobile device 13.

If the mobile device 13 exists at the location E, for example, and the communication control apparatus 11b receives a request for network entry from the mobile device 13, the communication control apparatus 11b identifies the communication control apparatus 11a which is responsible for the allocation of SIDs in the group class C1, and communicates with the communication control apparatus 11a. In compliance with the request from the communication control apparatus 11b, the communication control apparatus 11a allocates an SID to the mobile device 13 and transmits the allocated SID to the mobile device 13 via the communication control apparatus 11b.

The SID "1" is unique within the group G21, and accordingly, even if the mobile device 13 moves from one of the groups G11 and G12 to the other, the communication control apparatus 11a does not reallocate a different SID to the mobile device 13. When the mobile device 13 moves between different groups of the group class C2, on the other hand, the SID is reallocated. The SID reallocation is carried out between different groups of the group class C2 in the same manner as the handover process of the first embodiment. Specifically, the communication control apparatus 11a negotiates a common unused SID with the communication control apparatus which manages the SIDs in the different group of the group class C2, to allocate the unused SID to the mobile device.

Figure 13:
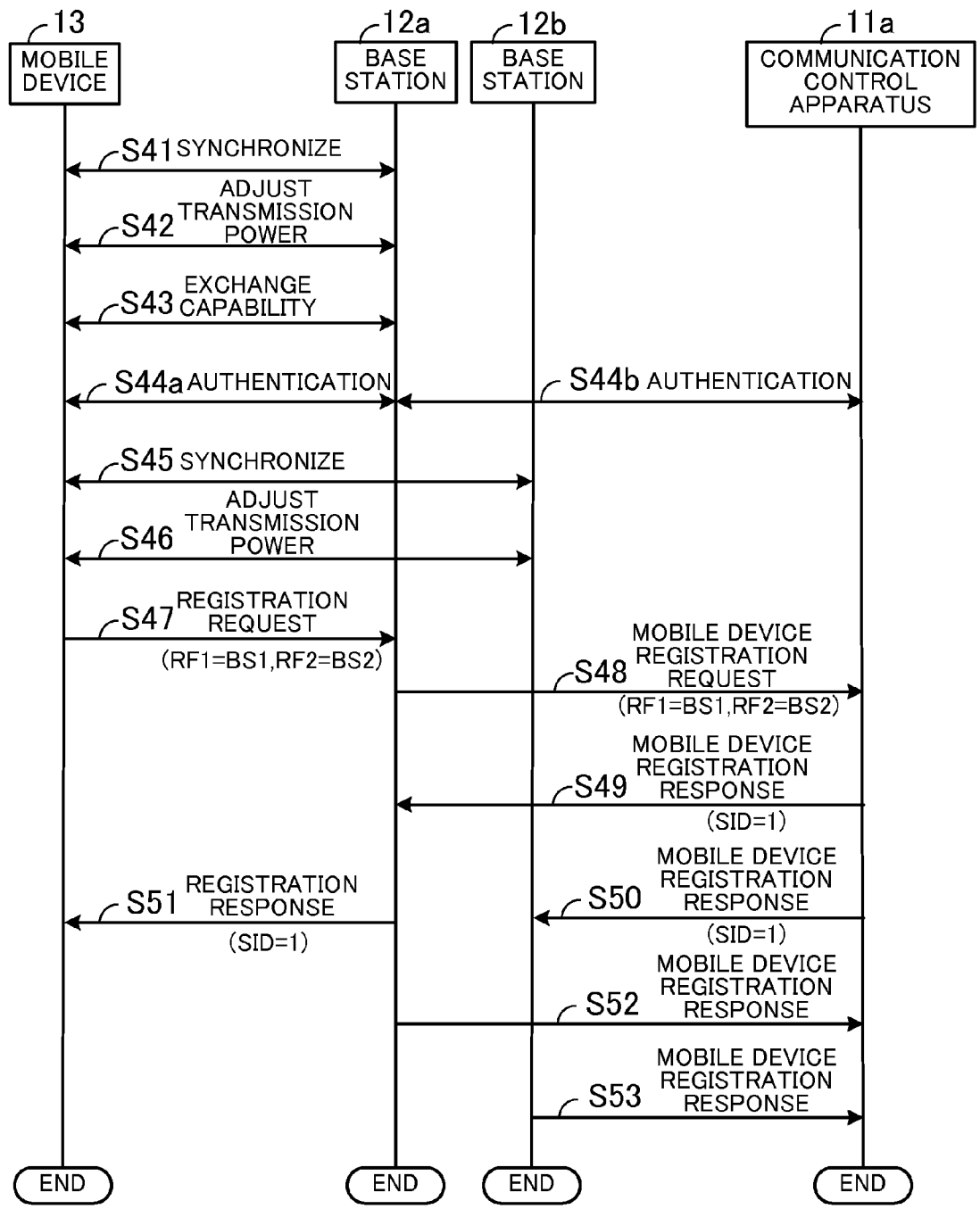
FIG. 13 is a sequence diagram illustrating the network entry of a mobile device.

FIG. 13 is a sequence diagram illustrating the network entry of the mobile device. Specifically, FIG. 13 illustrates a sequence of operations of the mobile device 13, the base stations 12a and 12b and the communication control apparatus 11a, all illustrated in FIG. 12. Let us suppose that the mobile device 13 enters the network at the location A illustrated in FIG. 12.

Steps S41 to S53 in the sequential process illustrated in FIG. 13 are respectively identical, except Steps S49 and S50, with Steps S1 to S13 in the sequential process illustrated in FIG. 6. In the following, therefore, Steps S49 and S50 will be explained.

In Step S49, the communication control apparatus 11a acquires an SID which is unused and also unique within the group G21 of the group class C2. Let it be assumed, for example, that the SID "1" has been acquired by the communication control apparatus 11a as an unused SID unique within the group G21. The communication control apparatus 11a transmits the SID "1" to the base station 12a, which is one of the targets of connection of the mobile device 13. Using the MS_Attachment_Rsp message, for example, the communication control apparatus 11a transmits the acquired SID to the base station 12a.

In Step S50, the communication control apparatus 11a transmits the SID "1", acquired in Step S49, to the base station 12b, which is the other of the targets of connection of the mobile device 13. The communication control apparatus 11a transmits the acquired SID "1" to the base station 12b by using the MS_Attachment_Rsp message, for example.

Where the communication control apparatus responsible for the allocation of SIDs in the group class C2 is the communication control apparatus 11b, the communication control apparatus 11a identifies the communication control apparatus 11b when a registration request for network entry is received from the mobile device 13, and then receives, from the communication control apparatus 11b, the SID to be allocated to the mobile device 13. Subsequently, the communication control apparatus 11a transmits the SID received from the communication control apparatus 11b to the mobile device 13.

Figure 14:
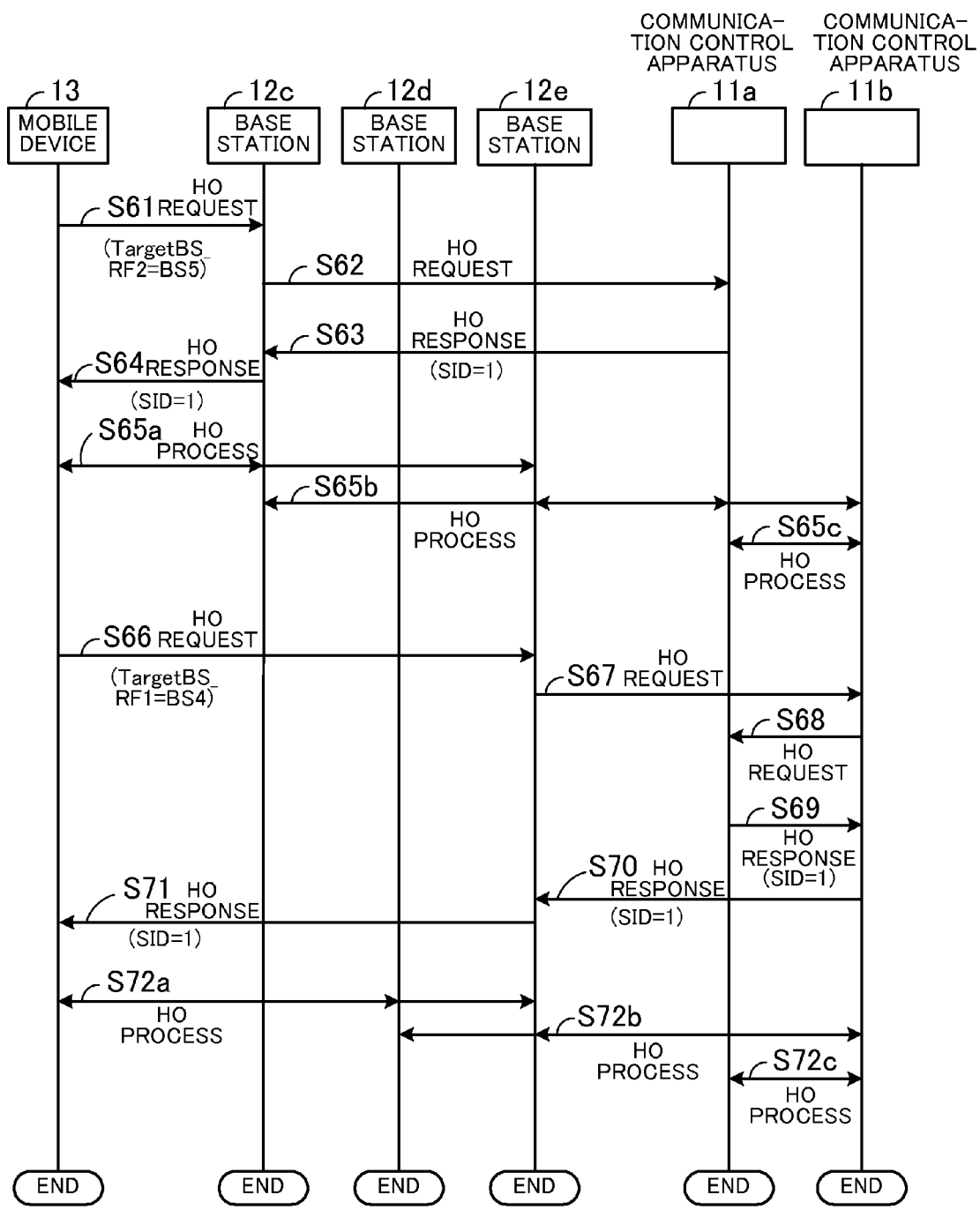
FIG. 14 is a sequence diagram illustrating handovers executed in a wireless communication system.

FIG. 14 is a sequence diagram illustrating handovers executed in the wireless communication system. Specifically, FIG. 14 illustrates a sequence of operations of the mobile device 13, the base stations 12c to 12e and the communication control apparatuses 11a and 11b, all illustrated in FIG. 12.

Steps S61 to S65c in the sequential process illustrated in FIG. 14 are a handover sequence executed when the mobile device 13 moves from the location C to the location D, illustrated in FIG. 12. Steps S61 to S65c are identical, except Steps S62 and S63, with Steps S21 to S26c in the sequential process explained above with reference to FIG. 7.

In FIG. 7, when the handover (HO) request is received in Step S22, the communication control apparatus 11a negotiates an unused SID with the communication control apparatus 11b which is responsible for the allocation of SIDs in the group G2 to which the target of connection of the wireless unit RF2 after the handover, namely, the base station 12e, belongs. In FIG. 14, on the other hand, since the mobile device 13 has been allocated the SID which is unused and unique within the group G21, no negotiation is conducted with the communication control apparatus 11b for an unused SID. In FIG. 14, when the handover request is received from the base station 12c in Step S62, the communication control apparatus 11a transmits information about the SID "1", which has been allocated to the mobile device 13, by including the allocated SID in the handover response, in Step S63.

Steps S66 to S72c in the sequential process illustrated in FIG. 14 are a handover sequence executed when the mobile device 13 moves from the location D to the location E, illustrated in FIG. 12. Steps S66 to S72c are identical, except Steps S68 to S70, with Steps S27 to S31c in the sequential process explained above with reference to FIG. 7.

In Step S67, the communication control apparatus 11b receives the handover request from the base station 12e, which is one of the targets of connection of the mobile device 13. The communication control apparatus 11b detects the movement of the mobile device 13 within the group G21 from the location D to the location E and sends a handover request to the communication control apparatus 11a which is responsible for the management of SIDs in the group class C2.

On receiving the handover request from the communication control apparatus 11b, the communication control apparatus 11a transmits, to the communication control apparatus 11b as a handover response, the SID "1" already allocated to the mobile device 13, in Step S69.

In Step S70, the communication control apparatus 11b transmits the SID "1" as a handover response to the base station 12e.

In this manner, the communication control apparatuses 11a and 11b need not execute the SID reallocation process insofar as the mobile device 13 moves within the group G21.

Figure 15:
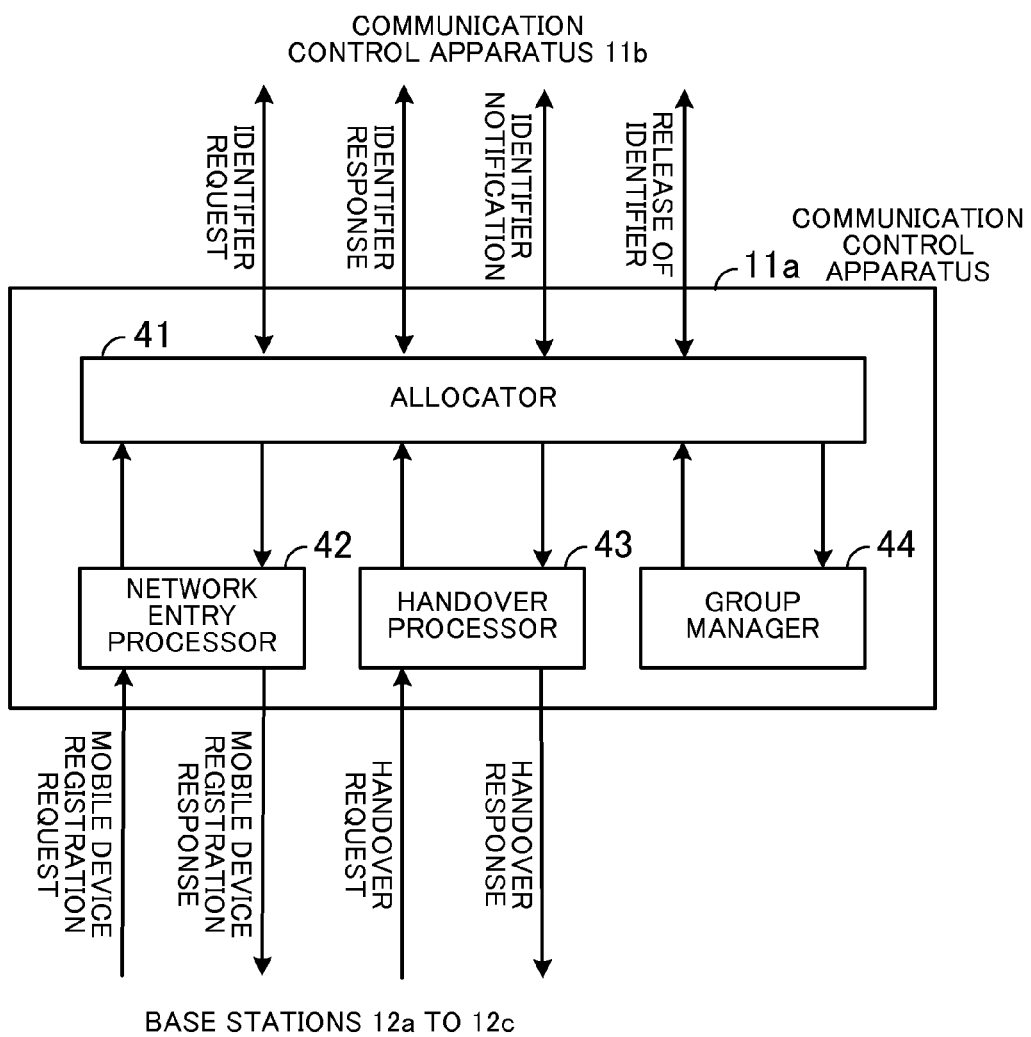
FIG. 15 is a block diagram of a communication control apparatus.

FIG. 15 is a block diagram of the communication control apparatus. As illustrated in FIG. 15, the communication control apparatus 11a includes an allocator 41, a network entry processor 42, a handover processor 43, and a group manager 44. The allocator 41 has an identifier management table. The group manager 44 has a group class management table and a group management table. The identifier management table held by the allocator 41 is identical with the identifier management table 21a illustrated in FIG. 9, and therefore, description thereof is omitted. In the following, the group class management table and identifier management table held by the group manager 44 will be explained.

FIG. 16 illustrates an exemplary data structure of the group class management table. As illustrated in FIG. 16, the group class management table 44a held by the group manager 44 has columns named "Identifier type" and "Group class".

Under the "Identifier type" column, the types of the intra-base station identifier and intra-mobile device identifier allocated to the mobile device 13 are registered. For example, "SID", "CID", "SLPID", "PSCID" and the like are registered. Under the "Group class" column, group classes in which the identifiers of the types specified in the corresponding "Identifier type" fields are uniquely allocated are registered.

For example, the group class management table 44a of FIG. 16 indicates that the SIDs are uniquely allocated in the group class C2, and also that the CIDs are uniquely allocated in the group class C1.

FIG. 17 illustrates an exemplary data structure of the group management table. As illustrated in FIG. 17, the group management table 44b held by the group manager 44 has columns named "Base station", "Group class C1", "Group class C2", "Class C1 communication control apparatus", and "Class C2 communication control apparatus".

Under the "Base station" column, information about the base stations 12a to 12f constituting the wireless communication network is registered. In FIG. 17, the base stations 1 to 6 respectively correspond to the base stations 12a to 12f illustrated in FIG. 12.

Under the "Group class C1" column, information on the group of the group class C1 which the base station specified in the corresponding "Base station" field belongs to is registered. In the example illustrated in FIG. 12, for example, the group of the group class C1 to which the base station 1 belongs is the group G11. Accordingly, "Group G11" is registered in the "Group class C1" field associated with the base station 1. Also, the group of the group class C1 to which the base station 5 belongs is the group G12, and therefore, "Group G12" is registered in the "Group class C1" field associated with the base station 5.

Under the "Group class C2" column, information on the group of the group class C2 which the base station specified in the corresponding "Base station" field belongs to is registered. In the example of FIG. 12, for example, the group of the group class C2 to which the base station 1 belongs is the group G21. Thus, "Group G21" is registered in the "Group class C2" field associated with the base station 1. Also, the group of the group class C2 to which the base station 5 belongs is the group G21, and therefore, "Group G21" is registered in the "Group class C2" field associated with the base station 5.

Under the "Class C1 communication control apparatus" column, information on the communication control apparatus which is responsible for the allocation of the identifiers in the group class C1 is registered. The communication control apparatus 1 corresponds to the communication control apparatus 11a illustrated in FIG. 12, and the communication control apparatus 2 corresponds to the communication control apparatus 11b illustrated in FIG. 12. Under the "Class C2 communication control apparatus" column, information on the communication control apparatus responsible for the allocation of the identifiers in the group class C2 is registered.

The group management table 44b illustrated in FIG. 17 indicates, for example, that the base station 1 belongs to the group G11 of the group class C1 and at the same time belongs to the group G21 of the group class C2. Also, it is found that the allocation of the identifiers to the base station 1 in the group class C1 is taken care of by the communication control apparatus 1, and that the allocation of the identifiers to the base station in the group class C2 is taken care of by the communication control apparatus 1.

Also, the group management table 44b indicates the following: The base station 5 belongs to the group G12 of the group class C1 and at the same time belongs to the group G21 of the group class C2. The allocation of the identifiers to the base station 5 in the group class C1 is taken care of by the communication control apparatus 2, and the allocation of the identifiers to the base station 5 in the group class C2 is taken care of by the communication control apparatus 1.

Referring again to FIG. 15, the allocator 41 sends the registration request of the mobile device 13, received by the network entry processor 42, to the group manager 44. At this time, the allocator 41 sends, to the group manager 44, information about the type of the identifier of which the registration has been requested by the mobile device 13. As a response to the registration request and the identifier type sent to the group manager 44, the allocator 41 receives, from the group manager 44, information indicating in which of the group classes C1 and C2 the identifier whose type has been sent as the registration request is managed, as well as information indicating which of the communication control apparatuses 11a and 11b is responsible for the allocation of the identifier. For example, where the registration request for network entry of the mobile device 13 and the identifier type "SID" are sent to the group manager 44, the allocator 41 receives, from the group manager 44, the information indicating that the SID is managed in the group class C2 and that the communication control apparatus 11a is responsible for the allocation of the SID.

Based on the information received from the group manager 44, the allocator 41 determines whether to negotiate with the other communication control apparatus 11b for a common unused identifier. In the exemplary sequence illustrated in FIG. 13, the targets of connection of the mobile device 13 are the base stations 12a and 12b and the communication control apparatus 11a itself takes the responsibility for allocating the SIDs in the group class C2. Accordingly, no negotiation is conducted with a different communication control apparatus which is responsible for the allocation of the SIDs in the different group of the group class C2. On the other hand, where the mobile device 13 is to connect to a base station belonging to a different group of the group class C2, the allocator 41 negotiates an SID with the communication control apparatus which takes the responsibility for allocating the SIDs in the different group of the group class C2. Information about the communication control apparatus responsible for the allocation of the SIDs in the different group of the group class C2 is acquired from the group manager 44. Where the SID registration request from the mobile device 13 is received by the allocator of the communication control apparatus 11b, the allocator of the communication control apparatus 11b acquires from the group manager information about the communication control apparatus 11a which is responsible for the allocation of the SIDs, and receives information about an unused SID from the communication control apparatus 11a.

The allocator 41 looks up the identifier management table and acquires an unused SID. Where no negotiation needs to be conducted with a different communication control apparatus, the allocator 41 allocates the acquired unused SID to the mobile device 13. On the other hand, where negotiation needs to be conducted with a different communication control apparatus, the allocator 41 negotiates with the different communication control apparatus to determine if the acquired unused SID is also not used in the different communication control apparatus. If the acquired SID is already in use, the allocator 41 acquires another unused SID and again negotiates with the different communication control apparatus.

Subsequently, the allocator 41 stores information about the intra-base station identifier allocated to the mobile device 13, in the identifier management table. Also, the allocator 41 sends, to the network entry processor 42, the SID allocated to the mobile device 13.

When a handover request is received from the handover processor 43, the allocator 41 looks up the identifier management table and acquires information about the base station which remains connected in spite of the handover, among the base stations 12a to 12f, and the base station to which the mobile device 13 is to be connected anew after the handover, among the base stations 12a to 12f. The allocator 41 sends the acquired information about the targets of connection, among the base stations 12a to 12f, to the group manager 44.

In the exemplary sequence of FIG. 14, for example, where the mobile device 13 moves from the location C to the location D, the base station to which the mobile device 13 is connected before and after the handover, among the base stations 12a to 12f, is the base station 12 (base station 3), and the base station to which the mobile device 13 is newly connected after the handover, among the base stations 12a to 12f, is the base station 12e (base station 5). In the exemplary sequence of FIG. 14, therefore, the allocator 41 sends information about the base stations 3 and 5 to the group manager 44.

Then, the allocator 41 receives, from the group manager 44, information about the group of the group class C2 to which the target base station after the handover belongs, as well as information about the communication control apparatus which is responsible for the allocation of the SIDs in that group. If the target base stations to which the mobile device 13 is connected belong to different groups of the group class C2, the allocator 41 determines on the basis of the information received from the group manager 44 whether to negotiate with a different communication control apparatus for an unused SID. For example, if one of the target base stations to which the mobile device 13 is connected after the handover belongs to a different group of the group class C2 and the allocation of SIDs in that group is managed by a different communication control apparatus, the allocator 41 decides to negotiate an unused SID.

In the case of the movement from the location C to the location D in the exemplary sequence of FIG. 14, the mobile device 13 is handed over but does not straddle different groups of the group class C2. Accordingly, the allocator 41 does not negotiate with a different communication control apparatus for an SID.

When negotiating with a different communication control apparatus of the group class C2, the allocator 41 transmits, to the different communication control apparatus, the SID already allocated to the mobile device 13. This is done to ensure that the SID remains unchanged as far as possible. If the SID is already used in the different communication control apparatus, the allocator 41 again negotiates with the different communication control apparatus for a different SID.

The allocator 41 stores the information about the SID allocated to the mobile device 13 in the identifier management table. Also, the allocator 41 sends, to the handover processor 43, the SID allocated to the mobile device 13.

If it is judged on the basis of the information acquired from the group manager 44 that because of the movement of the mobile device 13, the state of the mobile device 13 changes from a state in which the mobile device 13 straddles multiple groups of the group class C2 to a state in which the mobile device 13 ceases to be connected to one or more of the groups of the group class C2, the allocator 41 recognizes that the mobile device 13 will no longer be connected to one or more of the groups of the group class C2 because of the handover, and stores the information to that effect in a storage device such as memory. When a notification indicative of the completion of the handover is received from the handover processor 43, the allocator 41 notifies the communication control apparatus responsible for the allocation of SIDs in the group to which the mobile device 13 belonged before the handover that the SID is to be released. When notified that the SID is to be released, the allocator of the communication control apparatus 11a or 11b releases the corresponding SID in the identifier management table.

In the case of the movement from the location D to the location E in the exemplary sequence of FIG. 14, the mobile device 13 is handed over but does not straddle different groups of the group class C2. Thus, the allocator 41 does not notify a different communication control apparatus that the SID is to be released. When the mobile device 13 moves from the location D to the location E, however, the handover request of the mobile device 13 is transmitted to the communication control apparatus 11a via the base station 12e and the communication control apparatus 11b. On receiving the handover request from the mobile device 13 via the base station 12e, the allocator and the group manager of the communication control apparatus 11b identify the communication control apparatus 11a as the communication control apparatus responsible for the allocation of SIDs in the group class C2. The allocator of the communication control apparatus 11b then notifies the communication control apparatus 11a of the handover request. The communication control apparatus 11a transmits the SID "1", which has been allocated to the mobile device 13, to the mobile device 13 via the communication control apparatus 11b and the base station 12e.

The network entry processor 42 receives a registration request for network entry from the mobile device 13 via one of the base stations 12a to 12c. The network entry processor 42 then sends the received registration request to the allocator 41. Also, the network entry processor 42 transmits the intra-base station identifier and the intra-mobile device identifier, which have been acquired by the allocator 41 and allocated to the mobile device 13, to the corresponding one of the base stations 12a to 12c.

The handover processor 43 receives a handover request from the mobile device 13 via one of the base stations 12a to 12c. Then, the handover processor 43 sends the received handover request to the allocator 41. Also, the handover processor 43 transmits the intra-base station identifier, which has been acquired by the allocator 41 and allocated to the mobile device 13, to the corresponding one of the base stations 12a to 12c.

Based on the registration request of the mobile device 13 received from the allocator 41, the group manager 44 looks up the group class management table 44a and the group management table 44b. The registration request includes information about the base stations to which the mobile device 13 is to be connected as well as the identifier type. Thus, the group manager 44 acquires information indicating in which of the group classes C1 and C2 the identifier whose identifier type is included in the registration request is managed, and information indicating which of the communication control apparatuses 11a and 11b is responsible for the allocation of the identifier.

Also, the group manager 44 receives from the allocator 41 information about the base station which remains connected in spite of the handover, among the base stations 12a to 12f, and the base station to which the mobile device 13 is newly connected after the handover, among the base stations 12a to 12f. On receiving the information about the targets of connection among the base stations 12a to 12f, the group manager 44 looks up the group class management table 44a and the group management table 44b to acquire information about the group of the group class C2 to which the mobile device 13 belongs after the handover, and information about the communication control device which is responsible for the allocation of SIDs in that group.

The allocator 41, the network entry processor 42, the handover processor 43 and the group manager 44 allocate the identifiers in the group class C1 in the same manner as explained above with reference to FIG. 8, and therefore, description of the identifier allocation is omitted. Also, the mobile device 13 has a configuration identical with that illustrated in the block diagram of FIG. 11, and therefore, description of the configuration is omitted.

In this manner, small groups of base stations are accommodated in a larger group, and the identifiers are allocated so as to be unique within the larger group. When a handover is executed within the larger group, therefore, it is unnecessary to reallocate the intra-base station identifier, whereby the bandwidth needed by messages for transmitting and receiving the intra-base station identifiers can be reduced.

In the foregoing, the group G21 of the group class C2 contains the groups G11 and G12 of the group class C1, but the group G21 may be formed so as to cut across the group G12, for example. Namely, the group classes C1 and C2 form their respective groups independently of each other.

A third embodiment will be now described in detail with reference to the drawings. In the third embodiment, cells are formed in such a manner that at the boundary of groups, a small cell accommodated in a large cell of a certain group does not overlap with a cell of a different group. Also, when the mobile device tries to connect to base stations of different groups, the communication control apparatus controls the mobile device so as not to connect to the base station of the previous group to which the mobile device belongs.

Figure 18:
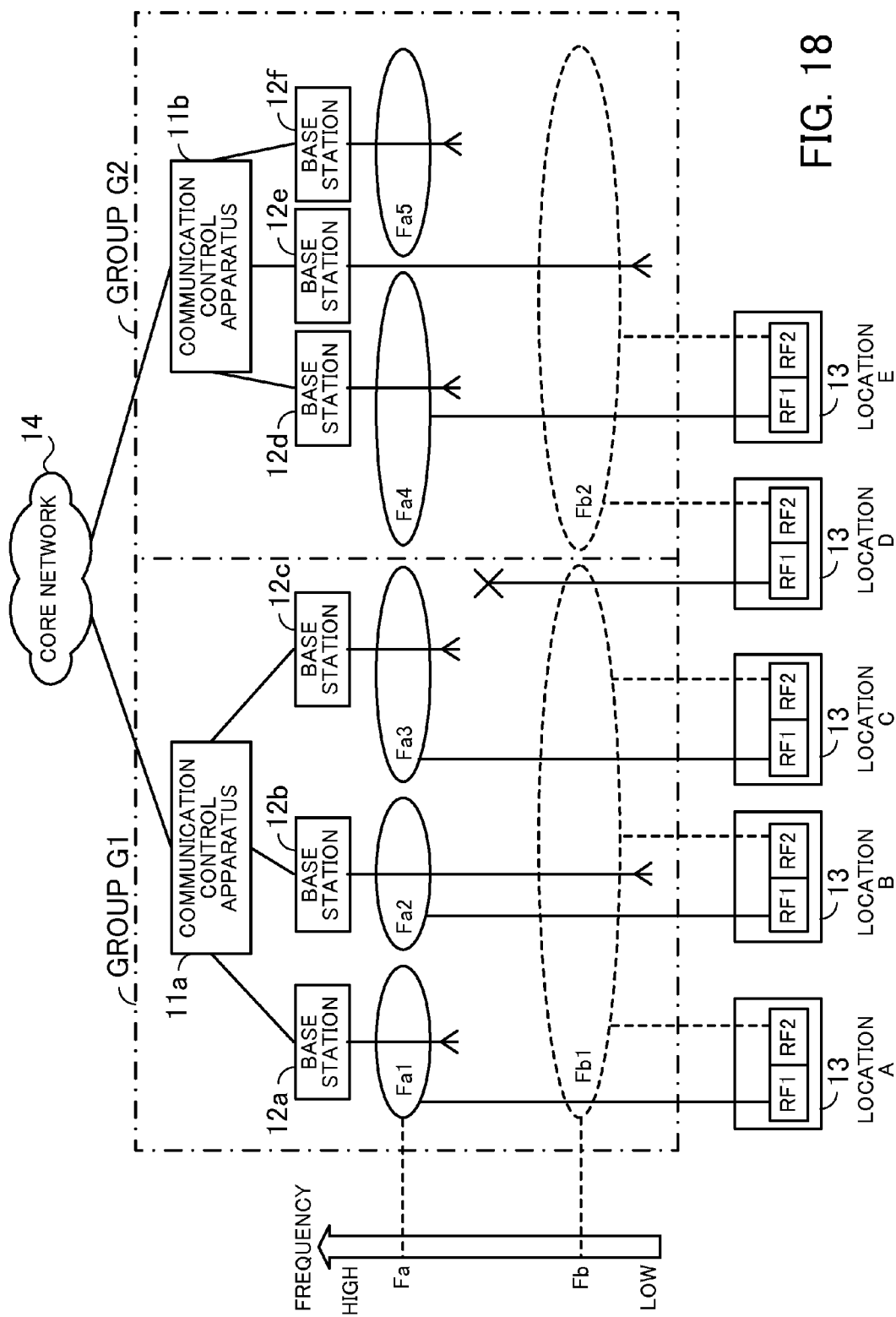
FIG. 18 is a diagram explaining the formation of cells and the grouping of base stations according to a third embodiment.

FIG. 18 illustrates the formation of cells and the grouping of base stations according to the third embodiment. In FIG. 18, like reference signs are used to denote like elements also appearing in FIG. 5, and description of such elements is omitted.

In FIG. 18, the cell Fa3 is accommodated in the cell Fb1 so as not to overlap with the cell Fb2 of the other group G2 larger than the cell Fa3, as distinct from the cell layout illustrated in FIG. 5. The size of the cell Fa3 can be varied by adjusting the power of the base station 12c, for example.

Where the cells are formed so that the small cell Fa3 may not overlap with the large cell Fb2 as illustrated in FIG. 18, the mobile device 13 basically does not simultaneously connect to one of the base stations 12a to 12c belonging to the group G1 and one of the base stations 12d to 12f belonging to the group G2. For example, when the mobile device 13 moves from the location C to the location D and the target of connection of the wireless unit RF2 changes to the base station 12e of the group G2 because of the handover, the target of connection of the wireless unit RF1 also changes to the base station 12d of the group G2.

Thus, where the small cell Fa3 is formed so as not to overlap with the large cell Fb2 of the different group G2, the wireless units RF1 and RF2 of the mobile device 13 can be basically simultaneously handed over to the respective base stations 12d and 12e of the group G2. Accordingly, the communication control apparatuses 11a and 11b need not negotiate with each other for an unused intra-base station identifier, making it possible to reduce the bandwidth used by messages for the negotiation.

Depending on the location of the mobile device 13, however, a situation can occur where the wireless unit RF2 can connect to the base station 12e of the group G2 but the wireless unit RF1 is unable to connect to the base station 12d of the group G2, that is, the wireless unit RF1 is connected to the base station 12c of the group G1.

In such a case, the mobile device 13 discontinues the connection of the wireless unit RF1 so that the wireless units RF1 and RF2 may not connect to base stations of the different groups G1 and G2. Then, when the mobile device 13 reaches the location E where the wireless unit RF1 can connect to the base station 12d, for example, the mobile device 13 establishes a connection with the base station 12d. Specifically, when the mobile device 13 moves across the boundary of the groups G1 and G2, the communication control apparatus 11b notifies the mobile device 13 of a recommended base station in the group G2 and controls the mobile device 13 so as not to connect to base stations of the different groups G1 and G2.

Figure 19:
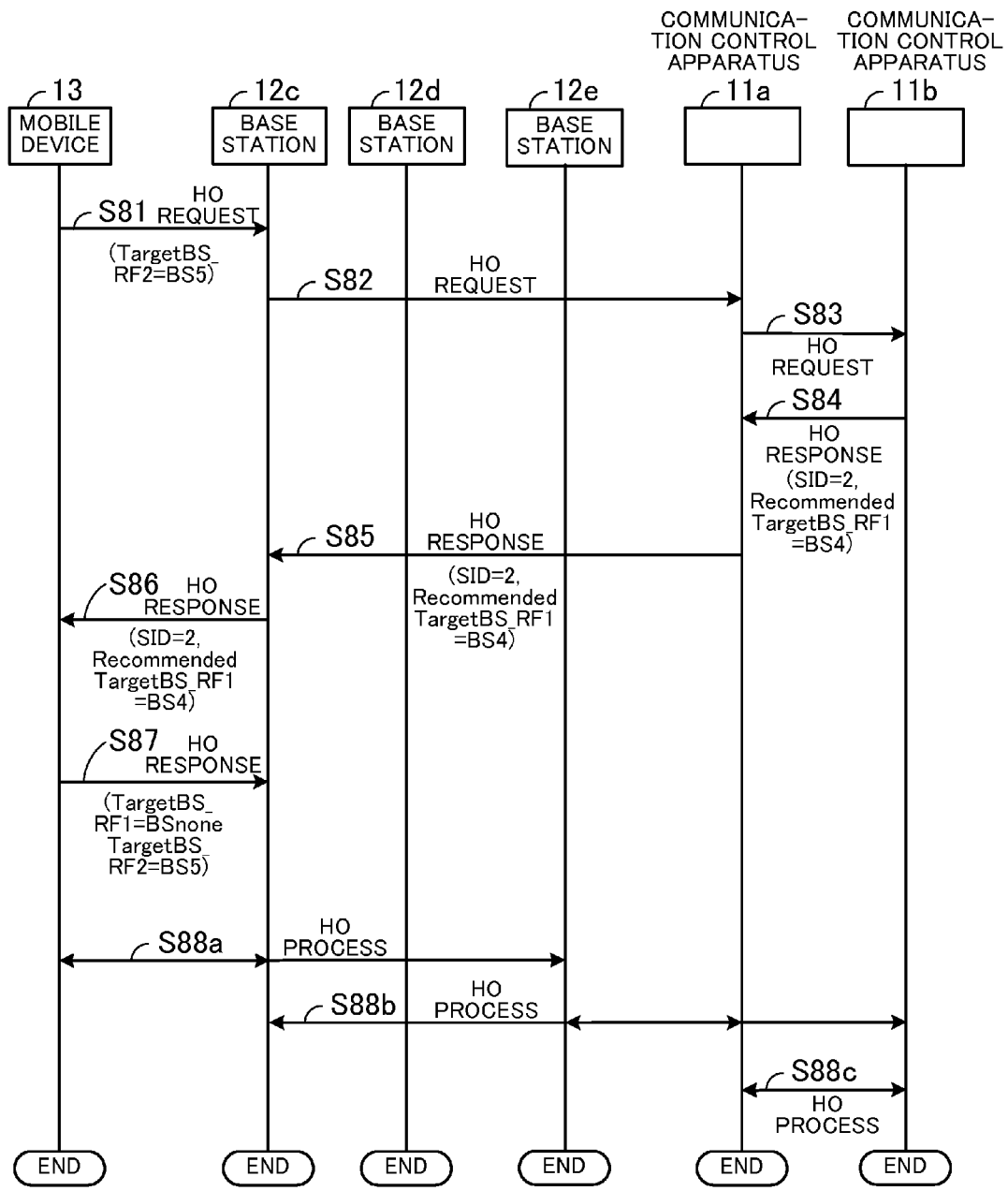
FIG. 19 is a sequence diagram illustrating a handover executed in a wireless communication system.

FIG. 19 is a sequence diagram illustrating a handover executed in the wireless communication system. Specifically, FIG. 19 illustrates a sequence of operations of the mobile device 13, the base stations 12c to 12e and the communication control apparatuses 11a and 11b, all appearing in FIG. 18. The sequential process illustrated in FIG. 19 is a handover sequence executed when the mobile device 13 moves from the location C to the location D illustrated in FIG. 18.

Steps S81 and S82 are identical with Steps S21 and S22 of the sequential process illustrated in FIG. 7, and therefore, description of these steps is omitted.

In Step S83, the communication control apparatus 11a sends a handover (HO) request to the communication control apparatus 11b which is responsible for the allocation of SIDs in the group G2 to which the target of connection of the wireless unit RF2 after the handover, namely, the base station 12e, belongs. The communication control apparatus 11a sends the handover request to the communication control apparatus 11b by including the information "TargetBS_RF2=BS5" in the HO-Req message, for example.

In Step S84, the communication control apparatus 11b allocates an unused SID "2", for example, to the mobile device 13 in compliance with the handover request from the communication control apparatus 11a. Also, based on the information "TargetBS_RF2=BS5" received from the communication control apparatus 11a, the communication control apparatus 11b judges that the target of connection of the wireless unit RF1 of the mobile device 13 also has to be a base station of the group G2, and identifies the base station 12d as such base station. The communication control apparatus 11b includes the allocated SID "2" and information ("RecommendedTargetBS_RF1=BS4") about the base station 12d which the wireless unit RF1 is to connect to, in the HO-Rsp message, for example, and transmits the HO-Rsp message to the communication control apparatus 11a.

In Step S85, the communication control apparatus 11a includes the SID "2" and "RecommendedTargetBS_RF1=BS4", received from the communication control apparatus 11b, in the HO-Rsp message, for example, and transmits the HO-Rsp message to the base station 12c.

In Step S86, the base station 12c includes the SID "2" and "RecommendedTargetBS_RF1=BS4", received from the communication control apparatus 11a, in the MOB_BSHO-RSP message, for example, and transmits the MOB_BSHO-RSP message to the mobile device 13.

In Step S87, the wireless unit RF1 of the mobile device 13 tries to connect to the base station indicated by the information "RecommendedTargetBS_RF1=BS4" received from the base station 12c. Let it be assumed here that the wireless unit RF1 of the mobile device 13 failed to connect to "BS4" (base station 12d of the group G2). In this case, the wireless unit RF1 of the mobile device 13 terminates its connection so that the mobile device 13 may not connect to base stations of the different groups G1 and G2.

In order to change the target of connection of the wireless unit RF2 to the base station 12e, the wireless unit RF1 of the mobile device 13 sends a handover notification to the base station 12c. The mobile device 13 includes, in an MOB_M-SHO-IND message, for example, information "TargetBS_RF1=BSnone", which indicates that the wireless unit RF1 has no target of connection, as well as information "TargetBS_RF2=BS5", and transmits the MOB_MSHO-IND message to the base station 12c.

Where the wireless unit RF1 of the mobile device 13 has succeeded in connecting to "BS4", the targets of connection of the wireless units RF1 and RF2 both belong to the group G2. In this case, since the mobile device 13 does not straddle the different groups G1 and G2, the communication control apparatuses 11a and 11b need not negotiate with each other for an SID to be allocated.

Steps S88a to S88c are identical with Steps S26a to S26c of the sequence illustrated in FIG. 7, and therefore, description of the steps is omitted.

Figure 20:
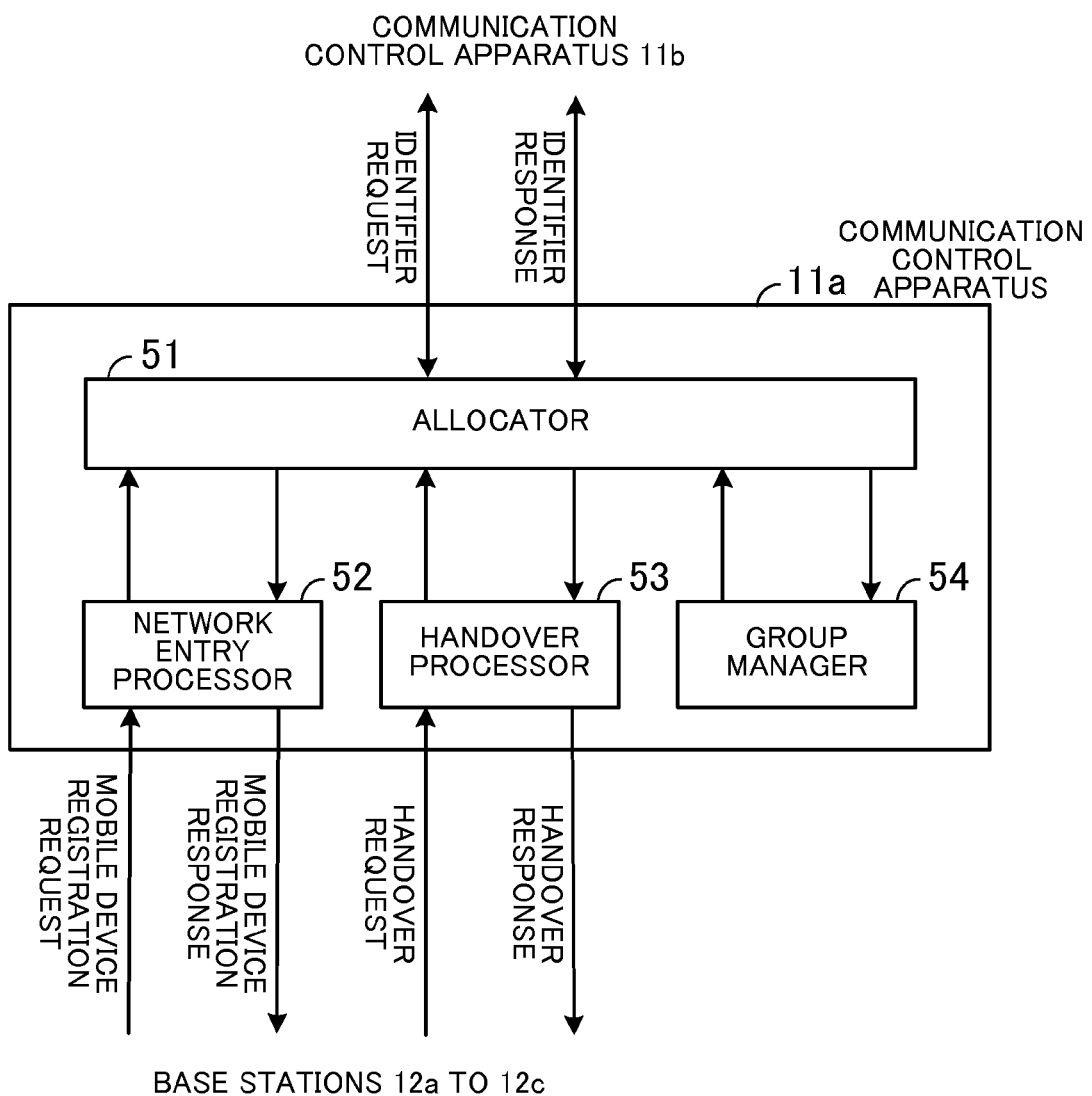
FIG. 20 is a block diagram of a communication control apparatus.

FIG. 20 is a block diagram of the communication control apparatus. As illustrated in FIG. 20, the communication control apparatus 11a includes an allocator 51, a network entry processor 52, a handover processor 53, and a group manager 54. The block diagram of FIG. 20 is similar to that of FIG. 8, but the communication control apparatus 11a of FIG. 20 differs from the counterpart of FIG. 8 in the function of the allocator 51.

The allocator 51 differs from the counterpart illustrated in FIG. 8 in that where a handover straddling the groups G1 and G2 has occurred, the allocator 51 does not negotiate an unused SID with the other communication control apparatus 11b but sends a handover request. In compliance with the handover request from the allocator 51, the allocator of the communication control apparatus 11b selects a recommended base station in its group G2 to which the wireless unit RF1 or RF2 of the mobile device 13 is to be connected, and notifies the communication control apparatus 11a of the recommended base station.

The allocator of the communication control apparatus 11b is aware of the status of the cells Fa4, Fa5 and Fb2 of the base stations 12d to 12f supervised thereby, for example. When a connection to the base station 12e is requested by the wireless unit RF2 of the mobile device 13, the allocator of the communication control apparatus 11b identifies the base station 12d having the cell Fa4 which is accommodated in the cell Fb2 of the base station 12e and which neighbors the group G1, and notifies the communication control apparatus 11a of the identified base station. The communication control apparatus 11a transmits the information about the base station 12d, received from the communication control apparatus 11b, to the mobile device 13.

In the foregoing, when the mobile device tries to connect to base stations of different groups, the communication control apparatus controls the mobile device so that the mobile device may not connect to the base station in the previous group to which the mobile device belongs. Alternatively, the communication control apparatus may notify the mobile device of a recommended base station in the previous group to which the mobile device belongs so that the mobile device may not connect to base stations of the different groups.

Also, in the above description, the connection of the wireless unit RF1 of the mobile device 13 is terminated in order that the wireless units RF1 and RF2 may not connect to base stations belonging to the different groups G1 and G2. Alternatively, the connection of the wireless unit RF1 may be continued and the connection of the wireless unit RF2 may be terminated instead. In this case, when the mobile device 13 reaches the location E where the mobile device 13 can connect to the base stations 12d and 12e, for example, the wireless units RF1 and RF2 may be connected to the base stations 12d and 12e, respectively.

In this manner, the cells are formed in such a manner that a small cell accommodated in a large cell of a certain group does not overlap with a cell of a different group at the boundary of the groups. When the mobile device 13 moves across the boundary of the groups G1 and G2, the communication control apparatus 11a or 11b notifies the mobile device 13 of a recommended base station to which the mobile device 13 is to connect. If the wireless unit RF1 or RF2 of the mobile device 13 fails to connect to the recommended base station, the wireless communication of the wireless unit RF1 or RF2 is stopped. Consequently, the communication control apparatuses 11a and 11b need not negotiate with each other for an unused intra-base station identifier, whereby the bandwidth used by messages for the negotiation between the communication control apparatuses 11a and 11b can be reduced.

With the communication control apparatus described above, it is possible to reduce the number of times the identifiers have to be reallocated uniquely.

In the embodiments, the communication control apparatuses 1, 2, 11a, and 11b include, for example, a network interface, a processor, a memory, a logic circuit, and so on. The network interface is a device for communicating to other apparatus. Examples of the network interface include a wired communication interface and a wireless communication interface. The processor is a device for processing data. Examples of the processor include a central processing unit (CPU) and a digital signal processor (DSP). The memory is a device for storing data. Examples of the memory include a read only memory (ROM) and a random access memory (RAM). The logic circuit is an electronic circuit which performs a logical operation. Examples of the logic circuit include a large scale integration (LSI) circuit, a field-programming gate array (FPGA) and an application specific integrated circuit (ASIC). In the communication control apparatus 1, the transmitter 1b is realized by the network interface. The allocators 1a and 21, the network entry processor 22, the handover processor 23, and the group manager 24 are realized by the processor, the memory or the logic circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A communication control apparatus for controlling communication of a mobile communication system including a plurality of cells formed by a plurality of base stations, comprising:
    a communication interface; and
    a processor configured
       to specify an identifier for wireless communication that differs from any of wireless communication identifiers already allocated to mobile devices existing within any of cells in a cell group constituted by a first cell and one or more cells partly overlapping with the first cell, and to allocate the specified wireless communication identifier to a mobile device existing in the cell group; and
       to control the communication interface to transmit the identifier allocated by an allocator to the mobile device;
    wherein, when the mobile device is to connect to base stations of different cell groups and communicate with the base stations simultaneously, the allocator selects one identifier in an identifier group and allocates the mobile device the selected identifier which is not used in the different cell groups and which can be used in common in the different cell groups; the identifier group including a plurality of identifiers being capable of allocating to mobile devices connected to a same cell.

2. The communication control apparatus according to claim 1, wherein, where the base stations of the different cell groups to which the mobile device is to connect are controlled by the communication control apparatus and a different communication control apparatus, respectively, the allocator negotiates with the different communication control apparatus to allocate the identifier which is not used in the different cell groups and which can be used in common in the different cell groups.

3. The communication control apparatus according to claim 1, wherein, when the mobile device connecting to the base stations of the different cell groups ceases to connect to one or more of the cell groups, the allocator releases the identifier of the one or more cell groups to which the mobile device is no longer connected.

4. The communication control apparatus according to claim 1, wherein the allocator allocates the mobile device an intra-mobile device identifier for wireless communication so that the allocated intra-mobile device identifier may be unique within the mobile device.

5. The communication control apparatus according to claim 1, wherein the allocator allocates the identifier so that the allocated identifier may be unique within a group including a plurality of cell groups.

6. An identifier allocation method for a communication control apparatus which controls communication of a mobile communication system including a plurality of cells formed by a plurality of base stations, comprising:

specifying an identifier for wireless communication that differs from any of wireless communication identifiers already allocated to mobile devices existing within any of cells in a cell group constituted by a first cell and one or more cells partly overlapping with the first cell, and allocating the specified wireless communication identifier to a mobile device existing in the cell group; and transmitting the allocated identifier to the mobile device;

wherein, when the mobile device is to connect to base stations of different cell groups and communicate with the base stations simultaneously, the communication control apparatus selects one identifier in an identifier group and allocates the mobile device the selected identifier which is not used in the different cell groups and which can be used in common in the different cell groups; the identifier group including a plurality of identifiers being capable of allocating to mobile devices connected to a same cell.

7. A mobile communication system including a plurality of cells formed by a plurality of base stations, comprising:

a plurality of base stations configured to form a cell group constituted by a first cell and one or more cells partly overlapping with the first cell; and a communication control apparatus configured to include an allocator configured to specify an identifier for wireless communication that differs from any of wireless communication identifiers already allocated to mobile devices existing within any of the cells in the cell group and to allocate the specified wireless communication identifier to a mobile device existing in the cell group, and a transmitter configured to transmit the identifier allocated by the allocator to the mobile device;

wherein, when the mobile device is to connect to base stations of different cell groups and communicate with the base stations simultaneously, the allocator selects one identifier in an identifier group and allocates the mobile device the selected identifier which is not used in the different cell groups and which can be used in common in the different cell groups; the identifier group including a plurality of identifiers being capable of allocating to mobile devices connected to a same cell.

* * * * *